(12) United States Patent
Kozuka et al.

(10) Patent No.: US 10,210,420 B2
(45) Date of Patent: Feb. 19, 2019

(54) IMAGE PROCESSING METHOD, IMAGE PROCESSING APPARATUS, AND RECORDING MEDIUM

(71) Applicant: Panasonic Intellectual Property Corporation of America, Torrance, CA (US)

(72) Inventors: Kazuki Kozuka, Osaka (JP); Toru Tanigawa, Osaka (JP); Masahiko Saito, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/450,360

(22) Filed: Mar. 6, 2017

(65) Prior Publication Data
US 2017/0262727 A1 Sep. 14, 2017

Related U.S. Application Data

(60) Provisional application No. 62/306,827, filed on Mar. 11, 2016.

(30) Foreign Application Priority Data

Sep. 27, 2016 (JP) .................. 2016-188647

(51) Int. Cl.
*G06K 9/00* (2006.01)
*G06K 9/46* (2006.01)
(Continued)

(52) U.S. Cl.
CPC ....... *G06K 9/4604* (2013.01); *G06K 9/00362* (2013.01); *G06K 9/00805* (2013.01);
(Continued)

(58) Field of Classification Search
CPC . G06T 7/11; G06T 7/0014; G06T 7/20; G06T 2207/30232; G06T 2207/20081;
(Continued)

(56) References Cited

U.S. PATENT DOCUMENTS

| 7,684,590 B2 | 3/2010 | Kämpchen et al. |
| 2013/0242127 A1 | 9/2013 | Kasahara et al. |

(Continued)

FOREIGN PATENT DOCUMENTS

JP 2013-197785 9/2013

OTHER PUBLICATIONS

The Extended European Search Report dated Jul. 17, 2017 for the related European Patent Application No. 17158268.7.

*Primary Examiner* — Carol Wang
(74) *Attorney, Agent, or Firm* — Greenblum & Bernstein, P.L.C.

(57) ABSTRACT

An image processing method includes acquiring consecutive time-series images captured by an onboard camera and including at least one image having a first annotation indicating a first region; determining, for each of the images, in reverse chronological order from an image of the last time point, whether the first region exists in the image based on whether the first annotation is attached; identifying the first image of a first time point for which the first region is determined not to exist, and setting a second region including a partial region of an object in the identified first image, indicating the moving object that is obstructed by the object before appearing on the path, and having dimensions based on dimensions of the first region in an image of a second time point immediately after the first time point; and attaching a second annotation to the image corresponding to the second time point, the second annotation indicating the second region.

15 Claims, 26 Drawing Sheets

(51) Int. Cl.
  *G06T 11/60*   (2006.01)
  *G08G 1/04*    (2006.01)
  *G08G 1/16*    (2006.01)
  *H04N 7/18*    (2006.01)
  *G06K 9/62*    (2006.01)
  *G06T 11/00*   (2006.01)

(52) U.S. Cl.
  CPC ............ *G06K 9/6259* (2013.01); *G06T 11/00* (2013.01); *G06T 11/60* (2013.01); *G08G 1/04* (2013.01); *G08G 1/166* (2013.01); *H04N 7/183* (2013.01)

(58) Field of Classification Search
  CPC . G06T 11/60; G06T 2219/004; G06F 17/218; G06K 9/00771; G06K 9/00261; G06K 9/00664; G06K 9/6256; G06K 9/00718; G06K 9/3233; G06K 9/00805; G06K 9/00791; G06K 9/4604; G06K 9/6259; G06K 9/00362; G08G 1/166; G08G 1/04; H04N 7/183
  See application file for complete search history.

(56) References Cited

U.S. PATENT DOCUMENTS

| | | | |
|---|---|---|---|
| 2014/0056479 A1* | 2/2014 | Bobbitt | G06K 9/00718 382/104 |
| 2015/0063725 A1* | 3/2015 | Tai | G06F 17/30247 382/306 |
| 2016/0117818 A1* | 4/2016 | Park | G06T 7/0012 382/131 |

* cited by examiner

IMAGE PROCESSING METHOD, IMAGE PROCESSING APPARATUS, AND RECORDING MEDIUM

BACKGROUND

1. Technical Field

The present disclosure relates to an image processing method, an image processing apparatus, and a recording medium.

2. Description of the Related Art

Recently, generic object recognition using neural-network-based machine learning technologies has achieved high performance and has been attracting attention.

However, in order to achieve high recognition performance by using neural-network-based generic object recognition, a learning process needs to be performed by using an enormous number of images to which information, such as the name and type of each recognition-target object, is attached as annotations (correct information).

It is also known that the accuracy increases in machine learning if large amounts of data (big data) are provided as training data.

A method for collecting big data is the use of outsourcing to a third party, such as crowdsourcing. Crowdsourcing is a mechanism for outsourcing a simple task to many unspecified individuals (workers) via the Internet at a low cost. Since the task for individual data items that constitute big data can be outsourced to many workers in a distributed manner if crowdsourcing is used to collect big data, the big data can be collected efficiently (at a relatively low cost in a relatively short period).

For example, Japanese Unexamined Patent Application Publication No. 2013-197785 discloses a technique for implementing crowdsourcing with a smaller number of people at high operation accuracy.

SUMMARY

In one general aspect, the techniques disclosed here feature an image processing method including acquiring a plurality of consecutive time-series images that have been captured by an onboard camera mounted on a vehicle and that include at least one image to which a first annotation is attached, the first annotation indicating a first region representing a moving object that is present in the vicinity of an object and on a path of the vehicle in the at least one image; determining, for each of the plurality of consecutive time-series images acquired in the acquiring, in reverse chronological order from an image corresponding to the last time point in the time series, whether the first region exists in the image on the basis of whether the first annotation is attached to the image; identifying a first image corresponding to a first time point for which it is determined for the first time in the determining that the first region does not exist from among the plurality of consecutive time-series images, and setting a second region including a part of a region of the object in the identified first image corresponding to the first time point and indicating a situation where the moving object is obstructed by the object before appearing on the path from behind the object, the second region having dimensions based on dimensions of the first region in an image corresponding to a second time point that is the next time point after the first time point in the time series; and attaching a second annotation to the image corresponding to the second time point, the second annotation indicating the second region set in the identifying and setting.

According to the aspect of the present disclosure, an image processing method and the like capable of reducing the variation in the quality of training data items can be implemented.

It should be noted that general or specific embodiments may be implemented as a system, a method, an integrated circuit, a computer program, a computer-readable recording medium such as a compact disc-read only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
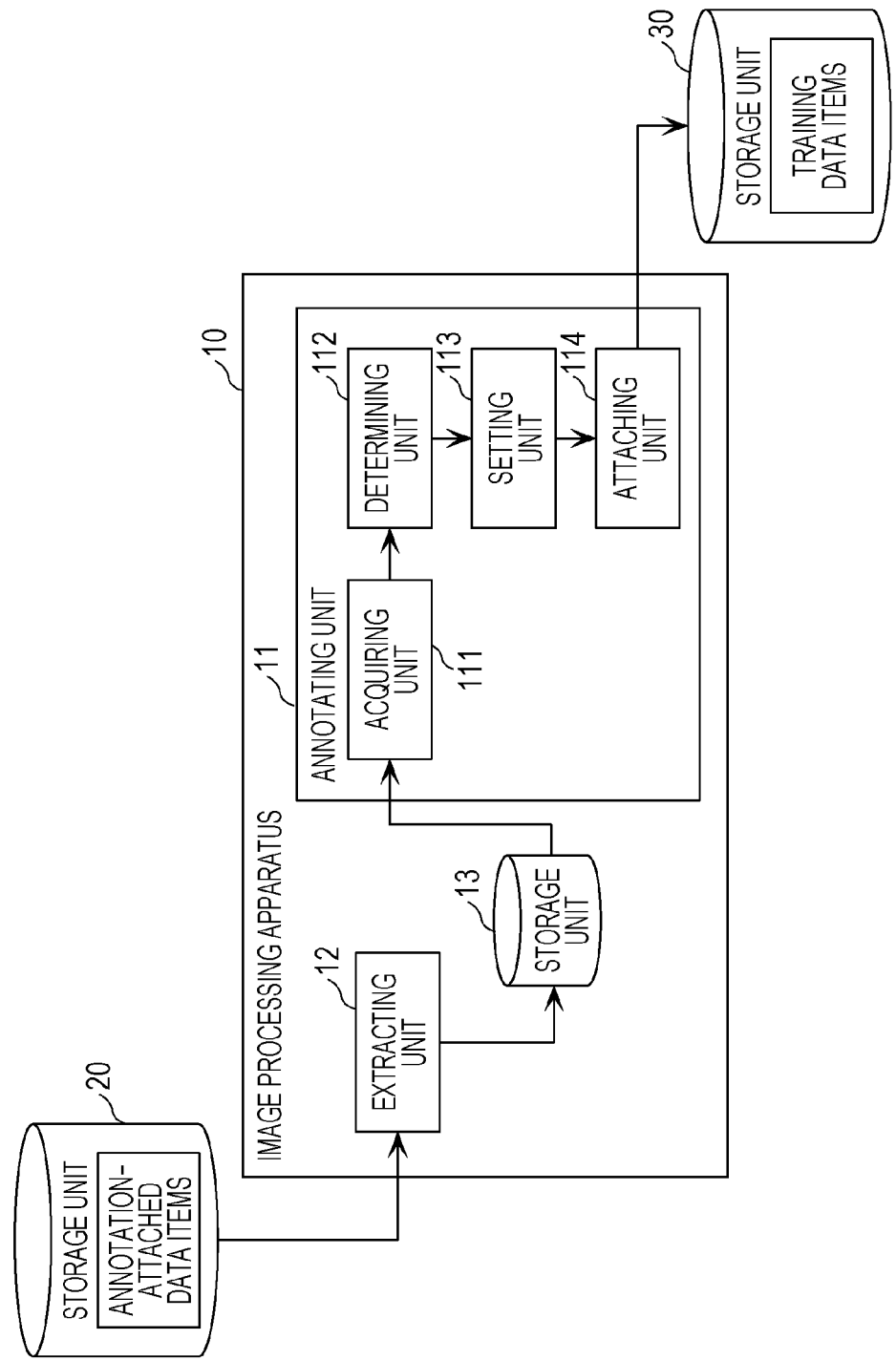
FIG. 1 is a diagram depicting an example of a functional configuration of an image processing apparatus according to a first embodiment.

In the case where an annotation-attaching task requires high-level recognition, the accuracy of the annotation-attaching task is likely to vary between crowdsourcing workers even if the technique disclosed in Japanese Unexamined Patent Application Publication No. 2013-197785 is used. The case where the annotation-attaching task requires high-level recognition is, for example, the case of attaching an annotation indicating a hazard region that can be hazardous for a vehicle in motion because a person suddenly comes out in front of the vehicle. It is more difficult to determine the position and hazard level for annotations indicating hazard regions than for annotations indicating the type and position of particular objects, and the accuracy varies greatly between workers. As a result, the quality of training data items obtained by crowdsourcing varies if the annotation-attaching task requires high-level recognition. When machine learning is performed by using big data constituted by training data items having varying qualities, the accuracy of learning does not increase.

One non-limiting and exemplary embodiment provides an image processing method, an image processing apparatus, and a recording medium capable of reducing the variation in the quality of training data items.

According to an aspect of the present disclosure, an image processing method includes acquiring a plurality of consecutive time-series images that have been captured by an onboard camera mounted on a vehicle and that include at least one image to which a first annotation is attached, the first annotation indicating a first region representing a moving object that is present in the vicinity of an object and on a path of the vehicle in the at least one image; determining, for each of the plurality of consecutive time-series images acquired in the acquiring, in reverse chronological order from an image corresponding to the last time point in the time series, whether the first region exists in the image on the basis of whether the first annotation is attached to the image; identifying a first image corresponding to a first time point for which it is determined for the first time in the determining that the first region does not exist from among the plurality of consecutive time-series images, and setting a second region including a part of a region of the object in the identified first image corresponding to the first time point and indicating a situation where the moving object is obstructed by the object before appearing on the path from behind the object, the second region having dimensions based on dimensions of the first region in an image corresponding to a second time point that is the next time point after the first time point in the time series; and attaching a second annotation to the image corresponding to the second time point, the second annotation indicating the second region set in the identifying and setting.

With such a configuration, the second annotation indicating the second region that requires high-level recognition if recognition is performed by crowdsourcing workers can be attached autonomously to a plurality of images that have been captured by an onboard camera. As a result, the variation in the quality of training data items including the plurality of images can be reduced.

For example, in the identifying and setting, the second region including a part of the region of the object in the identified first image corresponding to the first time point may be set by shifting the first region in the image corresponding to the second time point in a direction from the first region toward the object by a predetermined distance.

With such a configuration, the second annotation indicating the second region can be attached autonomously.

In addition, for example, in the identifying and setting, one or more images may be identified in a range from the first time point of the first image to a time point that is a predetermined period before the first time point in the time series, and the second region including a part of the region of the object may be set in the one or more identified images.

With such a configuration, the second annotation indicating the second region can be attached autonomously to one or more images.

In addition, for example, the image processing method may further include performing a first extracting process of selecting, from among all of consecutive time-series images that have been captured by the onboard camera mounted on the vehicle and that are associated with information representing braking force or acceleration of the vehicle, first extracted images that are a plurality of images up to a time point that precedes, by a predetermined period, a time point at which the braking force or acceleration of the vehicle is larger than a threshold; and performing a second extracting process of extracting the plurality of consecutive time-series images including at least one image to which the first annotation is attached from among all of the consecutive time-series images by selecting, from among the first extracted images selected through the first extracting process, a plurality of consecutive time-series images including one or more images to which an annotation indicating a region representing a moving object that is present on the path of the vehicle is attached, wherein in the acquiring, the plurality of consecutive time-series images extracted through the second extracting process may be acquired.

With such a configuration, the second annotation indicating the second region can be attached autonomously after time-series images, to which the second annotation indicating the second region may be attached and which include at least one image to which the first annotation indicating the first region is attached, are extracted from among the plurality of images that have been captured by the onboard camera.

For example, the image processing method may further include causing crowdsourcing workers to attach, to each of the all of the consecutive time-series images, an annotation indicating a region representing a moving object that is present in the image prior to the first extracting process.

In addition, for example, the image processing method may further include causing crowdsourcing workers to attach, to each of the first extracted images selected through the first extracting process, an annotation indicating a region representing a moving object that is present in the first extracted image prior to the second extracting process.

With such a configuration, crowdsourcing workers can be caused to attach the annotation indicating a region representing a moving object that exists in each image.

For example, the second region may be a hazard region involving a risk of collision with the moving object when the vehicle is in motion, and the image processing method may further include adding, to the second annotation attached in the attaching, a hazard level based on the braking force or acceleration at a time point at which the braking force or acceleration of the vehicle is larger than the threshold.

With such a configuration, the hazard level can further included in the second annotation indicating the second region that is a hazard region for a vehicle in motion.

In addition, for example, the moving object may be a person, and the second region may have dimensions equal to dimensions of the first region.

With such a configuration, the second annotation indicating the second region can be attached autonomously as a hazard region involving a risk of collision with a person when the vehicle is in motion.

In addition, for example, the object may be a vehicle that is stationary, the moving object may be a door of the vehicle, and the second region may have dimensions equal to dimensions of the first region.

With such a configuration, the second annotation indicating the second region can be autonomously attached as a hazard region involving a risk of collision when the vehicle is in motion.

In addition, for example, the moving object may be an object for a child to play with, and the second region may have dimensions equal to dimensions of a region obtained by enlarging the first region in a height direction of the first image corresponding to the first time point.

With such a configuration, the second annotation indicating the second region can be attached autonomously as a hazard region involving a risk of collision with a child when the vehicle moves in the second region.

In addition, for example, the second region may be a hazard region involving a risk of collision with the moving object when the vehicle is in motion, and the image processing method may further include adding, to the second annotation attached in the attaching, a hazard level based on an attribute of the moving object.

With such a configuration, the hazard level can be further included in the second annotation indicating the second region that is a hazard region for a vehicle in motion.

In addition, for example, the second region may be a hazard region involving a risk of collision with the moving object when the vehicle is in motion, and the image processing method may further include adding, to the second annotation attached in the attaching, a hazard level that increases as the dimensions of the second region increase.

With such a configuration, the hazard level can be further included in the second annotation indicating the second region that is a hazard region for a vehicle in motion.

In addition, for example, the determining may include performing a first determining process of determining, in reverse chronological order from the image corresponding to the last time point in the time series, the first image corresponding to a third time point to which the first annotation is not attached from among the plurality of consecutive time-series images acquired in the acquiring, and performing a second determining process of determining, through image processing, whether the first region exists at a position in each of the images that is obtained by shifting the first region in an image corresponding to the next time point after the third time point of the first image that has been determined in the first determining process in a direction from the first region toward the object in the image in reverse chronological order from the image corresponding to the third time point.

With such a configuration, it can be determined whether at least one image includes the first region through image processing even if the first annotation indicating the first region, which is supposed to be attached to the at least one image, is not attached. With the first annotation, the second annotation indicating the second region that requires high-level recognition can be further attached. Consequently, the variation in the quality of training data items including the plurality of images can be reduced.

In addition, according to another aspect of the present disclosure, an image processing apparatus includes an acquirer that acquires a plurality of consecutive time-series images that have been captured by an onboard camera mounted on a vehicle and that include at least one image to which a first annotation is attached, the first annotation indicating a first region representing a moving object that is present in the vicinity of an object and on a path of the vehicle in the at least one image; a determiner that determines, for each of the plurality of consecutive time-series images acquired by the acquirer, in reverse chronological order from an image corresponding to the last time point in the time series, whether the first region exists in the image on the basis of whether the first annotation is attached to the image; a setter that identifies a first image corresponding to a first time point for which it is determined for the first time by the determiner that the first region does not exist from among the plurality of consecutive time-series images, and sets a second region including a part of a region of the object in the identified first image corresponding to the first time point and indicating a situation where the moving object is obstructed by the object before appearing on the path from behind the object, the second region having dimensions based on dimensions of the first region in an image corresponding to the next time point after the first time point in the time series; and an attacher that attaches a second annotation to the image corresponding to the second time point, the second annotation indicating the second region set by the setter.

It should be noted that these general or specific embodiments may be implemented as a system, a method, an integrated circuit, a computer program, a computer-readable recording medium such as a CD-ROM, or any selective combination thereof.

An image processing method and the like according to an aspect of the present disclosure will be described specifically below with reference to the accompanying drawings. Each of the embodiments described below provides specific examples of the present disclosure. The values, shapes, materials, components, arranged positions of the components, etc., described in the following embodiments are merely illustrative and are not intended to limit the present disclosure. In addition, among the components in the following embodiments, a component not recited in any of the independent claims indicating the most generic concept is described as an optional component. In addition, the configuration of each embodiment can be combined with that of another embodiment.

First Embodiment

Configuration of Image Processing Apparatus 10

FIG. 1 is a diagram depicting an example of a functional configuration of an image processing apparatus 10 according to a first embodiment.

The image processing apparatus 10 performs image processing for autonomously attaching, to annotation-attached data items stored in a storage unit 20, another annotation that requires high-level recognition if it is done by workers and outputs resultant data items as training data items to a storage unit 30. In the first embodiment, the annotation-attached data items are a plurality of images that have been captured by an onboard camera and to which an annotation indicating an obviously existing moving object is attached by crowdsourcing workers. Since attaching an annotation to a moving object that obviously exists in images does not require high-level recognition of workers, the outcome is unlikely to vary between workers and the quality does not vary.

In the first embodiment, the image processing apparatus 10 includes an annotating unit 11, an extracting unit 12, and a storage unit 13 as depicted in FIG. 1. Each of the components will be described in detail below.

Annotating Unit 11

Figure 2:
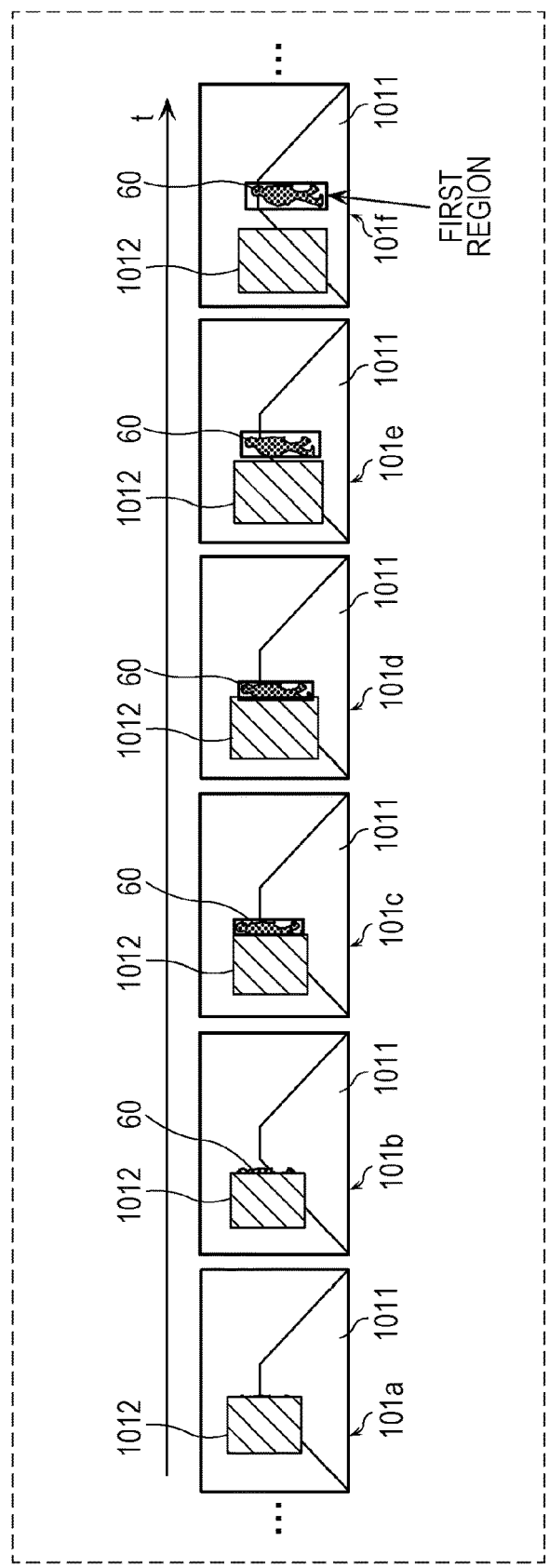
FIG. 2 is a diagram depicting an example of a plurality of images acquired by an annotating unit in the first embodiment.
Figure 3:
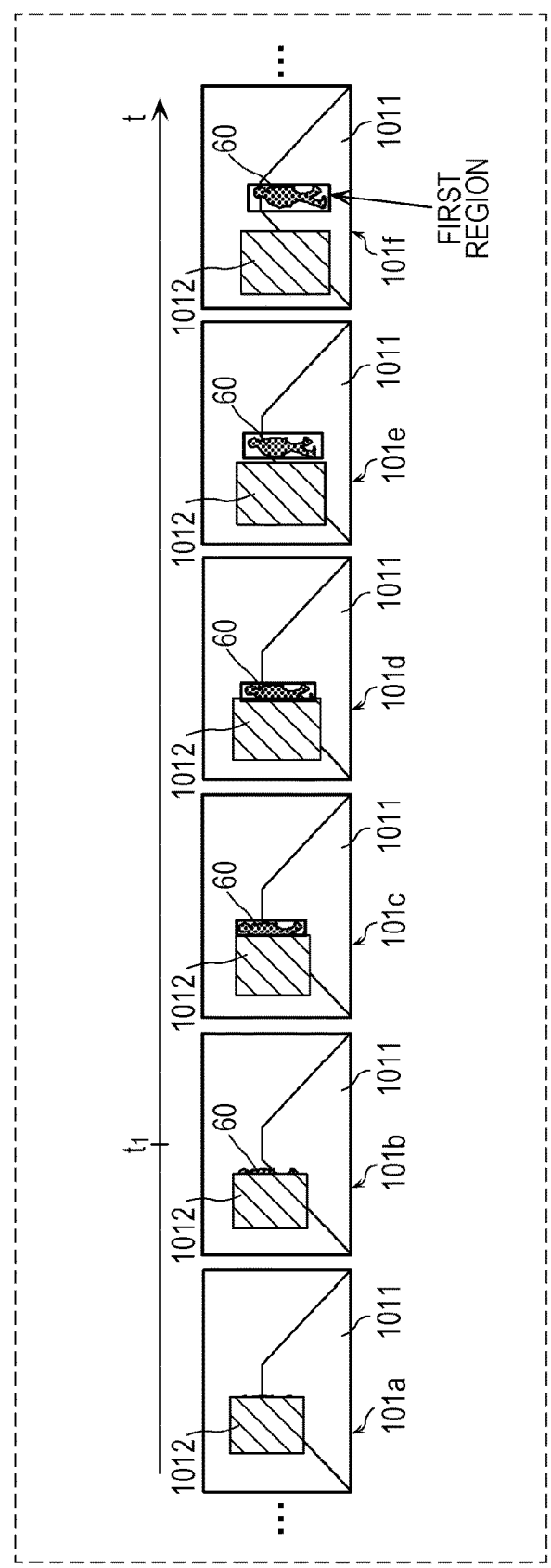
FIG. 3 is an explanatory diagram of image processing performed by the annotating unit on the plurality of images depicted in FIG. 2 in the first embodiment.
Figure 4:
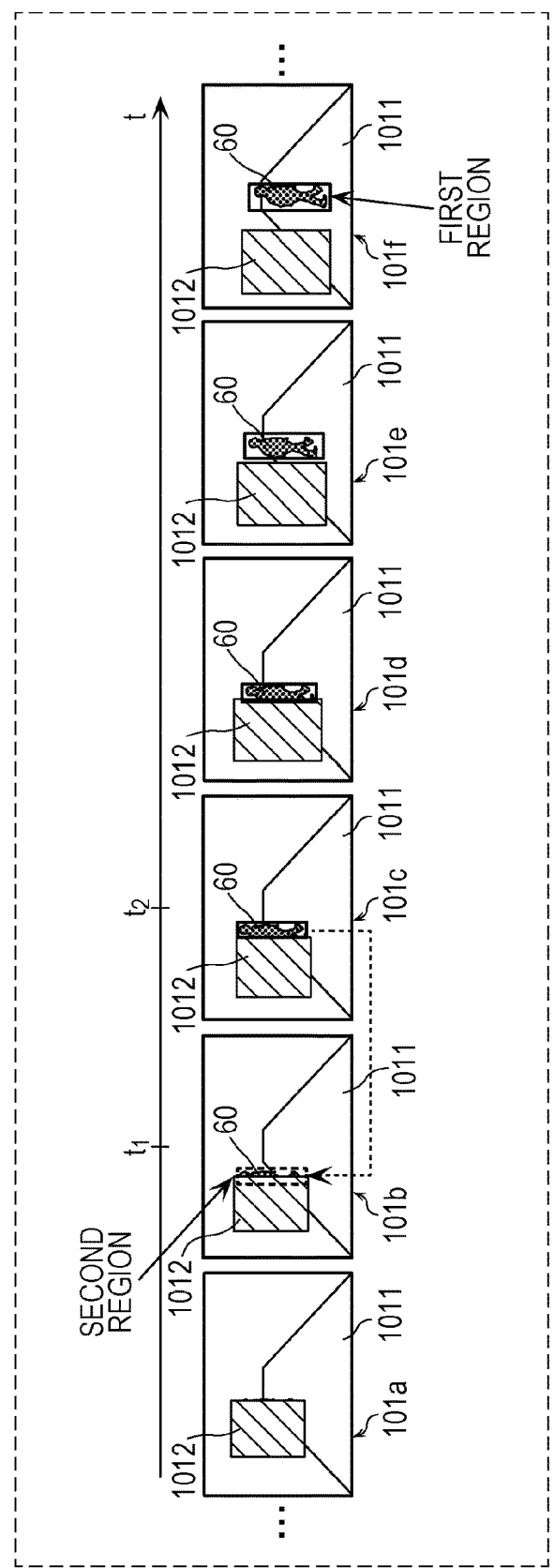
FIG. 4 is an explanatory diagram of an example of the image processing performed by the annotating unit on the plurality of images depicted in FIG. 2 in the first embodiment.

FIG. 2 is a diagram depicting an example of a plurality of images acquired by the annotating unit 11 in the first embodiment. FIGS. 3 and 4 are explanatory diagrams of an example of image processing performed by the annotating unit 11 on the plurality of images depicted in FIG. 2 in the first embodiment.

The annotating unit 11 includes an acquiring unit 111, a determining unit 112, a setting unit 113, and an attaching unit 114 as depicted in FIG. 1.

Acquiring Unit 111

The acquiring unit 111 acquires a plurality of images that are consecutive time-series images captured by an onboard camera mounted on a vehicle. The plurality of images include at least one image to which a first annotation is attached. The first annotation indicates a first region that represents a moving object that is present in the vicinity of an object and on a path of the vehicle in the at least one image.

In the first embodiment, the acquiring unit 111 acquires, from the storage unit 13, data items to which the first annotation indicating the first region is attached, such as a plurality of consecutive time-series images depicted in FIG. 2, for example.

Now, the plurality of consecutive time-series images are described with reference to FIG. 2.

The plurality of images depicted in FIG. 2 are some of a plurality of images that constitute training data items and are a plurality of consecutive time-series images that constitute a part of a video image captured by an onboard camera mounted on a vehicle, for example. More specifically, the plurality of images depicted in FIG. 2 include frames 101a, 101b, 101c, 101d, 101e, 101f, etc. Each of the plurality of images include (images of) a road 1011 and an object 1012, and some of the plurality of images (frames 101b to 101f) include a moving object 60, such as a person. Since movement of a vehicle such as an automobile is larger (faster) than movement of the moving object 60 such as a person in general in images constituting a video image captured by an onboard camera, the moving object 60 appears to move away (or move closer) in the plurality of images. The moving object 60 depicted in FIG. 2 is a person.

Further, some images (frames 101c to 101f) out of the plurality of images include a first region (first annotation). The first region (first annotation) indicates a moving object that exists in the vicinity of an object and on a path of the vehicle, among the obviously existing moving objects 60.

The following description will be given on the assumption that the moving object 60 is a person.

Determining Unit 112

The determining unit 112 determines, for each of the plurality of images acquired by the acquiring unit 111, in reverse chronological order sequentially from the image corresponding to the last time point of the time series, whether the first region exists in the image on the basis of whether the first annotation is attached to the image.

In the first embodiment, the determining unit 112 determines, for each of the plurality of images depicted in FIG. 2, whether the first region exists in the image on the basis of whether the first annotation is attached to the image (frame) in an order of the frame 101f, the frame 101e, . . . , the frame 101a, for example. For example, since the first annotation is attached to the frame 101f, the determining unit 112 determines that the first region exists in the frame 101f and determines the position and dimensions of a frame representing the first region that is present in the frame 101f. The determining unit 112 performs the similar determination for the frames 101e to 101c in this order, a description of which is omitted since the determination process is as described above. In addition, since the first annotation is not attached to the frames 101a and 101b, the determining unit 112 determines that the first region does not exist in the frames 101a and 101b.

Setting Unit 113

The setting unit 113 identifies the first image corresponding to a first time point for which the determining unit 112 has determined that the first region does not exists from among the plurality of images. The setting unit 113 then sets a second region that includes a part of a region of an object in the identified first image corresponding to the first time point and indicates a situation where the moving object is obstructed by the object before appearing on the path of the vehicle from behind the object. The setting unit 113 sets the dimensions of the second region in accordance with the dimensions of the first region in an image corresponding to a second time point, which is the next time point after the first time point in the time series. At that time, the setting unit 113 sets the second region that includes a part of the region of the object in the first image corresponding to the first time point by shifting the first region in the image corresponding to the second time point in the direction from the first region toward the object by a predetermined distance. In the case where the moving object is a person, the second region has substantially the same dimensions as the first region.

In the first embodiment, the setting unit 113 identifies the first image corresponding to the first time point for which the determining unit 112 has determined that the first region does not exist from among the plurality of images depicted in FIG. 2 and then sets the second region including a part of the region of the object in the identified first image corresponding to the first time point. The second region is a hazard region involving a risk of collision with a moving object (person) when the vehicle is in motion.

More specifically, as depicted in FIG. 3, the setting unit 113 identifies the frame 101*b* corresponding to a time point $t_1$ which is the first time point for which the determining unit 112 has determined that the first region does not exist from among the plurality of images depicted in FIG. 2. Then, the setting unit 113 sets the second region including a part of the region of the object 1012 in the identified frame 101*b* corresponding to the time point $t_1$ as depicted in FIG. 4.

The second region has substantially the same dimensions as the first region represented by a frame surrounding the moving object 60, which is a person, in the frame 101*c*, which is an image corresponding to a time point $t_2$ immediately after the identified time point $t_1$. The second region is set at a position in the frame 101*b* corresponding to the time point $t_1$, which is shifted from the position corresponding to the first region in the frame 101*c* corresponding to the time point $t_2$ by a predetermined distance. The predetermined distance is, for example, a distance over which the moving object 60 has moved in a period of $(t_2-t_1)$. In addition, the second region includes a part of the region of the object 1012 in the frame 101*b* corresponding to the time point $t_1$ and indicates a situation where the moving object 60 is obstructed by the object 1012 before appearing on the path of the vehicle from behind the object 1012. This indicates that, when the vehicle is in motion at the time point $t_1$, there is a risk of the vehicle colliding with the moving object 60, which is a person, at the time point $t_2$. That is, the second region indicates a hazard region that involves a risk of collision with a moving object (person) when the vehicle is in motion.

In this way, the setting unit 113 successfully sets the second region in one or more images autonomously.

It has been described that the setting unit 113 sets the second region in the identified image corresponding to the first time point; however, the configuration is not limited to this one. The setting unit 113 may identify the image corresponding to the first time point, further identify one or more images corresponding to the respective time points in a predetermined period before the first time point in the time series, and set the second region including a part of the region of the object in the one or more identified images.

Figure 5:
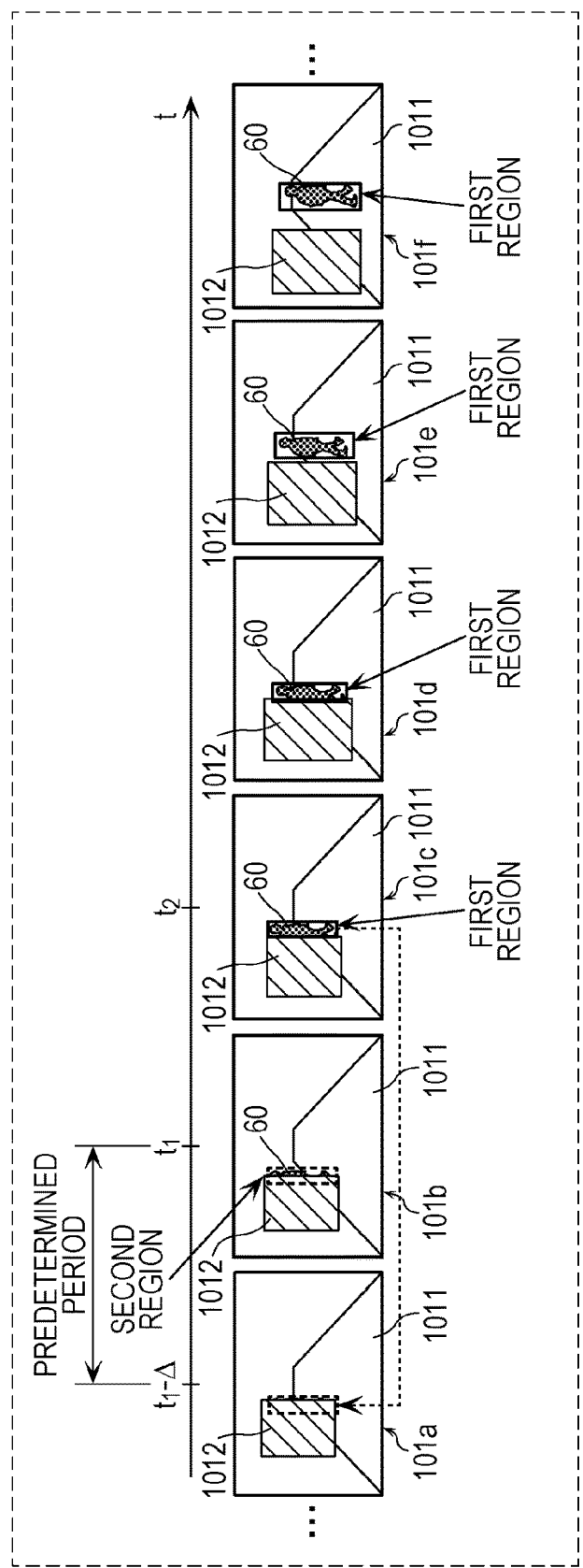
FIG. 5 is an explanatory diagram of another example of the image processing performed by the annotating unit on the plurality of images depicted in FIG. 2 in the first embodiment.

This process will be described specifically below with reference to FIG. 5. FIG. 5 is an explanatory diagram of another example of image processing performed by the annotating unit 11 on the plurality of images depicted in FIG. 2 in the first embodiment.

As depicted in FIG. 5, the setting unit 113 identifies the frame 101*b* corresponding to the time point $t_1$, which is the first time point for which the determining unit 112 has determined that the first region does not exist from among the plurality of images depicted in FIG. 2. The setting unit 113 further identifies an image (frame 101*a* in FIG. 5) in a range from the time point $t_1$ of the identified frame 101*b* to a time point $(t_1-\Delta)$ that is a predetermined period before the time point $t_1$. The setting unit 113 then sets the second region including a part of the region of the object 1012 in the frames 101*b* and 101*a* in the range from the identified time point $(t_1-\Delta)$ to the time point $t_1$. Since the specific method for setting the second region is as described above, the detailed description thereof is omitted. In this way, the setting unit 113 successfully sets the second region in one or more images autonomously.

The setting unit 113 may identify the last image at a time point $t_2$ for which the determining unit 112 has determined that the first region exists from among the plurality of images depicted in FIG. 2. In this case, the setting unit 113 may further identify images (frames 101*a* and 101*b* in FIG. 5) in a range from the time point $t_2$ of the identified frame 101*c* to a time point $(t_2-\Delta)$ that is a predetermined period before the time point $t_2$. The setting unit 113 then may set the second region including a part of the region of the object 1012 in the frames 101*a* and 101*b* in the range from the identified time point $(t_2-\Delta)$ to the time point $t_2$.

Attaching Unit 114

The attaching unit 114 attaches the second annotation indicating the second region set by the setting unit 113.

In the first embodiment, the attaching unit 114 attaches the second annotation indicating the second region set by the setting unit 113 to, for example, the image(s) depicted in FIGS. 4 and 5. The attaching unit 114 also outputs, to the storage unit 30, the plurality of images to which the second annotation is attached (annotation-attached data to which the second annotation is further attached) as training data items.

Configuration of Extracting Unit 12

Figure 6:
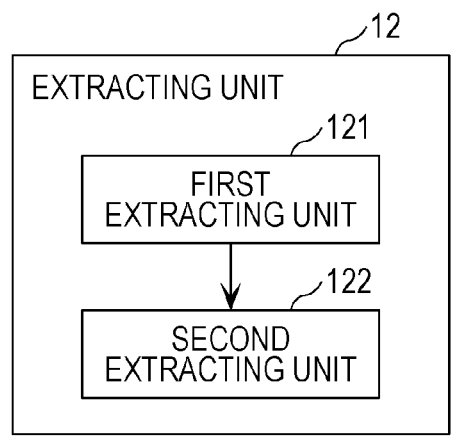
FIG. 6 is a diagram depicting an example of a detailed functional configuration of an extracting unit depicted in FIG. 1.
Figure 7:
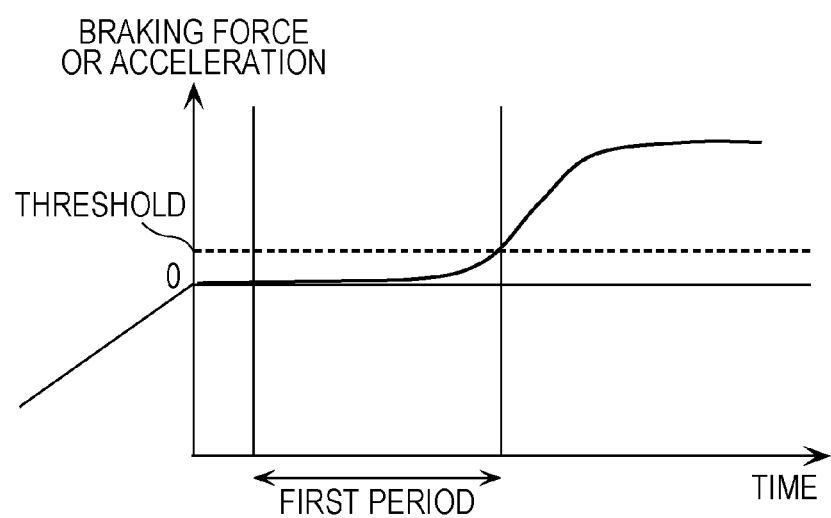
FIG. 7 is an explanatory diagram of a first extracting method performed by the extracting unit in the first embodiment.
Figure 8:
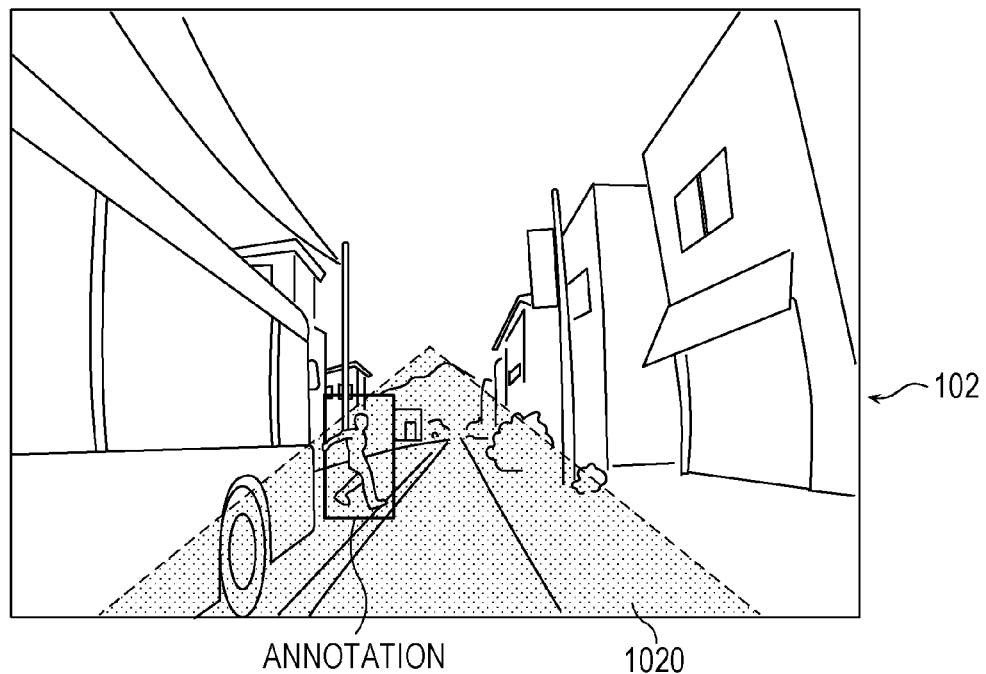
FIG. 8 is an explanatory diagram of a second extracting method performed by the extracting unit in the first embodiment.

FIG. 6 is a diagram depicting an example of a detailed functional configuration of the extracting unit 12 depicted in FIG. 1. FIG. 7 is an explanatory diagram of a first extracting method performed by the extracting unit 12 in the first embodiment. FIG. 8 is an explanatory diagram of a second extracting method performed by the extracting unit 12 in the first embodiment.

As depicted in FIG. 6, the extracting unit 12 includes a first extracting unit 121 and a second extracting unit 122.

The extracting unit 12 extracts predetermined time-series images from annotation-attached data items acquired from the storage unit 20 and stores the predetermined time-series images in the storage unit 13. The predetermined time-series images are time-series images that are possibility assigned a hazard region that involves a risk of collision with a moving object (person) when the vehicle is in motion and that requires high-level recognition if it is assigned by workers.

In the first embodiment, the storage unit 20 is constituted by a hard disk drive (HDD), a memory, or the like and stores data items to which an annotation is attached by crowdsourcing workers (annotation-attached data items). The annotation-attached data items are all the consecutive time-series images that have been captured by an onboard camera mounted on the vehicle and that are associated with information representing braking force or acceleration of the vehicle. The annotation-attached data items are all the images to which an annotation, which indicates a region representing a moving object that is in the respective images, is attached by crowdsourcing workers.

The first extracting unit 121 extracts, for example, a plurality of images (first extracted images) associated with a first period depicted in FIG. 7 on the basis of braking information or the like from among all the images which are the annotation-attached data items stored in the storage unit 20. More specifically, the first extracting unit 121 extracts, from among all the consecutive time-series images that have been captured by an onboard camera mounted on a vehicle and that are associated with information representing braking force or acceleration of the vehicle, the first extracted images which are a plurality of images in a range from a time point at which the braking force or acceleration of the vehicle exceeds a threshold to a time point preceding the time point by a predetermined period.

Then, the second extracting unit 122 further extracts, from the plurality of images (first extracted images) extracted by the first extracting unit 121, a plurality of consecutive time-series images including images having an annotation attached to the path along which the vehicle travels, by performing image processing or the like. The path along which the vehicle travels is, for example, a road 1020 in an image (frame 102) depicted in FIG. 8. More specifically, the second extracting unit 122 extracts a plurality of images including at least one image to which the first annotation indicating the first region is attached from among all the images by selecting a plurality of consecutive time-series images including one or more images having an annotation indicating a region that represents a moving object that is present on the path of the vehicle from among the first extracted images selected by the first extracting unit 121.

The second extracting unit 122 then stores the plurality of extracted images in the storage unit 13.

Storage Unit 13

The storage unit 13 is constituted by an HDD, a memory, or the like. The storage unit 13 stores the plurality of images extracted by the extracting unit 12.

Operation of Image Processing Apparatus 10

An operation performed by the image processing apparatus 10 configured in the above manner will be described next with reference to FIGS. 9 to 12.

Figure 9:
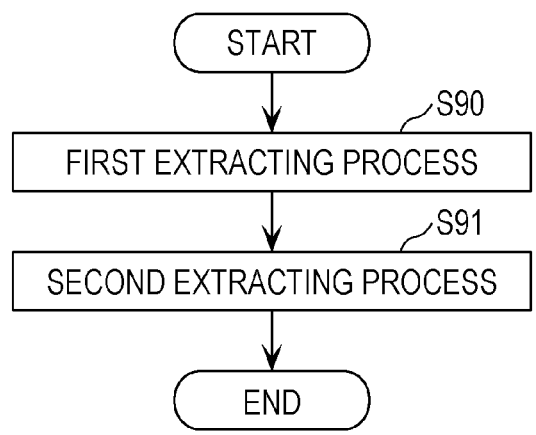
FIG. 9 is a flowchart describing an operation performed by the extracting unit of the image processing apparatus according to the first embodiment.

FIG. 9 is a flowchart describing an operation performed by the extracting unit 12 of the image processing apparatus 10 in the first embodiment.

Referring to FIG. 9, the extracting unit 12 of the image processing apparatus 10 first acquires annotation-attached data items from the storage unit 20.

Then, the extracting unit 12 performs a first extracting process on the acquired annotation-attached data items by using braking information or the like (S90). Specifically, the extracting unit 12 extracts, from among all the consecutive time-series images that have been captured by an onboard camera mounted on a vehicle and that are associated with information representing braking force or acceleration of the vehicle, the first extracted images which are a plurality of images in a range from a time point at which the braking force or acceleration of the vehicle exceeds a threshold to a time point that is a predetermined period before the time point.

Then, the extracting unit 12 further performs a second extracting process on the first extracted images obtained in S90 by performing image processing or the like (S91). Specifically, the extracting unit 12 extracts a plurality of images including at least one image to which the first annotation indicating the first region is attached from among all the images by selecting a plurality of consecutive time-series images including one or more images to which an annotation indicating a region representing a moving object that is present on the path of the vehicle is attached from among the first extracted images obtained by the first extracting process as described above. The extracting unit 12 then stores the plurality of images extracted through the second extracting process in the storage unit 13.

Figure 10:
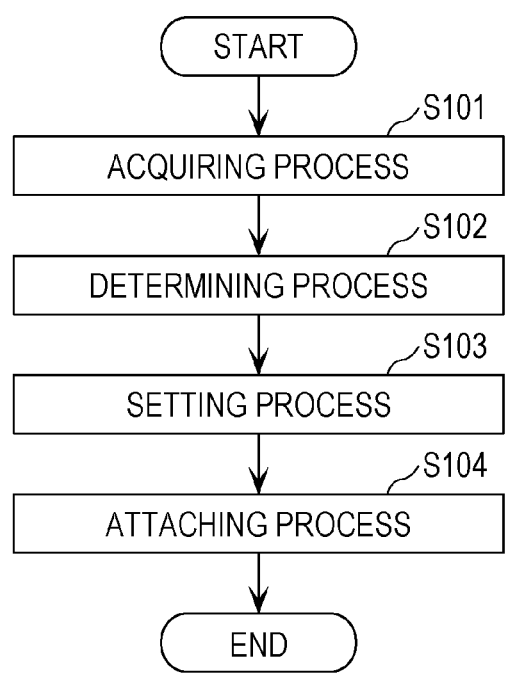
FIG. 10 is a flowchart describing an operation performed by the annotating unit of the image processing apparatus according to the first embodiment.
Figure 11:
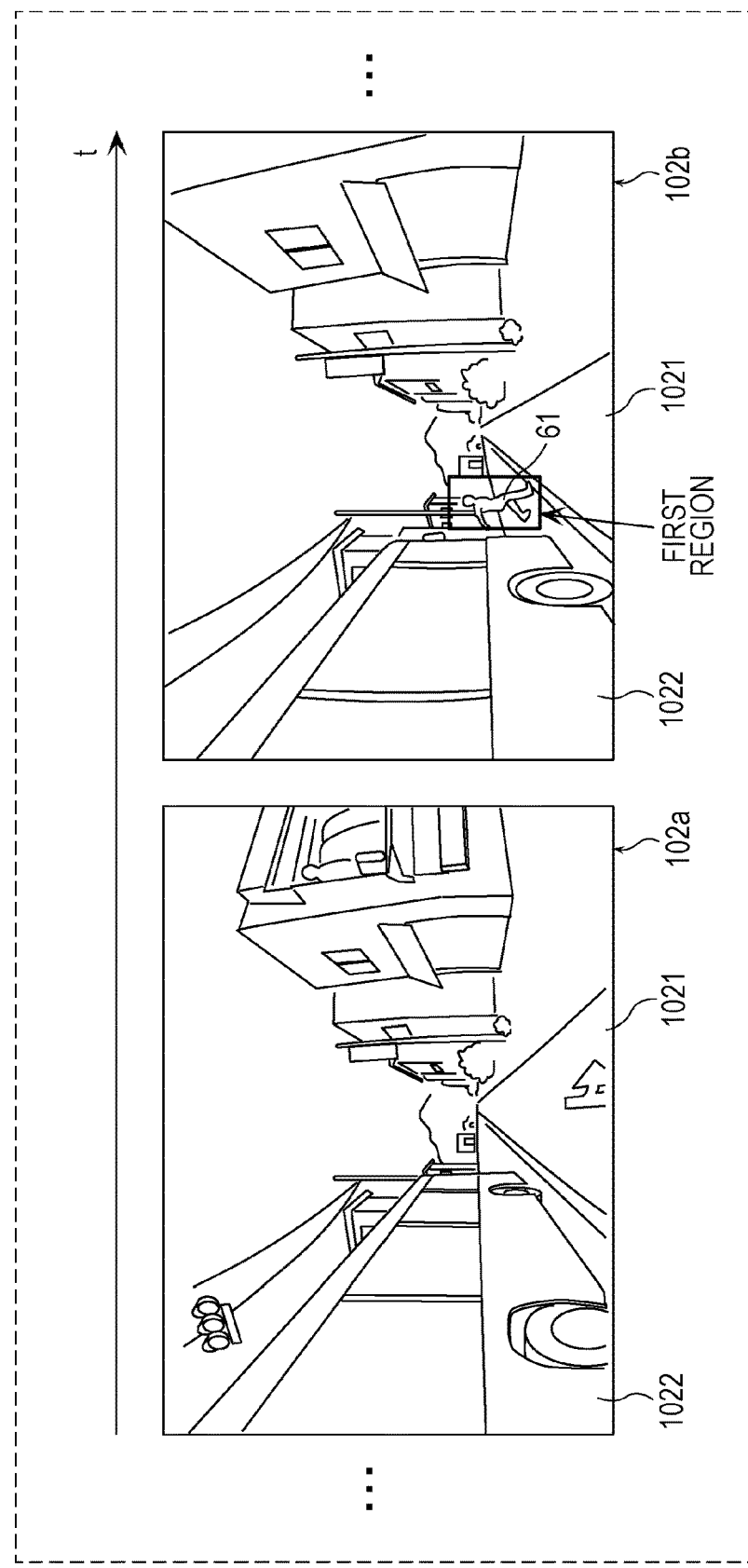
FIG. 11 is a diagram depicting an example of a plurality of images acquired by the annotating unit in the first embodiment.
Figure 12:
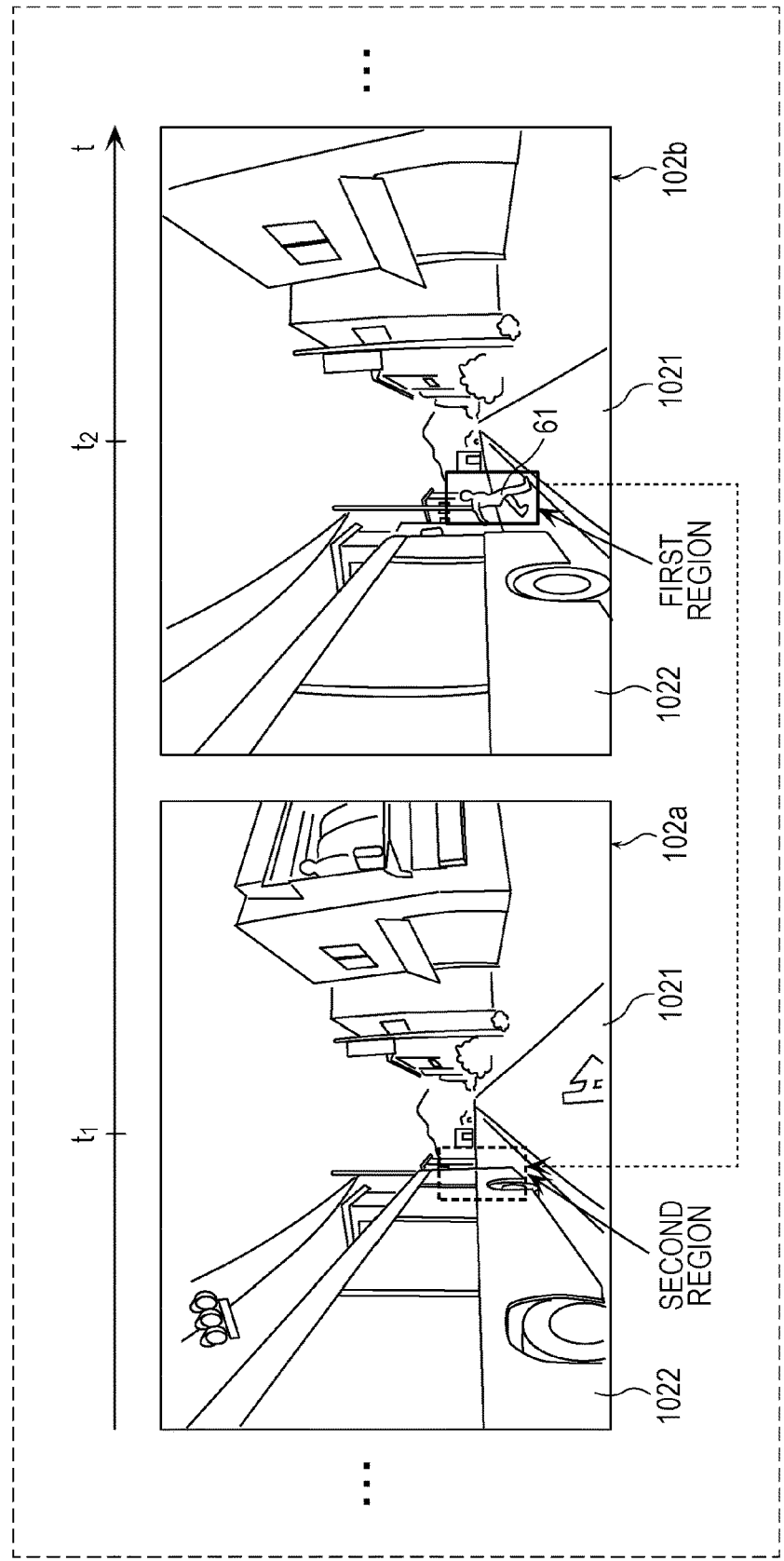
FIG. 12 is a diagram depicting an example of a second region that is set and attached by the annotating unit in the first embodiment.

FIG. 10 is a flowchart describing an operation performed by the annotating unit 11 of the image processing apparatus 10 in the first embodiment. FIG. 11 is a diagram depicting an example of a plurality of images acquired by the annotating unit 11 in the first embodiment. FIG. 12 is a diagram depicting an example of the second region that is set and attached by the annotating unit 11 in the first embodiment.

Referring to FIG. 10, the annotating unit 11 of the image processing apparatus 10 first performs an acquiring process of acquiring, from the storage unit 13, the plurality of images extracted through the second extracting process (S101). More specifically, the annotating unit 11 acquires a plurality of consecutive time-series images that have been extracted through the second extracting process and that include at least one image to which the first annotation is attached. The first annotation indicates the first region representing a moving object that is present in the vicinity of an object and on the path of the vehicle in the image as described above. For example, the annotating unit 11 acquires a plurality of images that include frames 102*a*, 102*b*, . . . depicted in FIG. 11 and that include at least one frame including a bus (corresponding to an object 1022) and a person (corresponding to a moving object 61) that is present in the vicinity of the object 1022 and on a road 1021 (corresponding to the path of the vehicle).

Then, the annotating unit 11 performs a determining process of determining, for each of the plurality of images acquired in S101, whether the first region exists in the image (S102). More specifically, the annotating unit 11 determines, for each of the plurality of images acquired in S101, in reverse chronological order from the image corresponding to the last time point in the time series as described above, whether the first region exists in the image on the basis of whether the first annotation is attached to the image.

Then, the annotating unit 11 performs a setting process of identifying the first image corresponding to the first time point for which it has been determined in S102 that the first region does not exist from among the plurality of images and of setting the second region including a part of the object in the identified first image corresponding to the first time point (S103). Specifically, the annotating unit 11 first identifies the first image corresponding to the first time point for which it has been determined in S102 that the first region does not exist from among the plurality of images as described above. Then, the annotating unit 11 sets the second region that includes a part of the region of the object in the identified first image corresponding to the first time point and that has substantially the same dimensions as the first region in an image corresponding to a second time point that is the next time point after the first time point in the time series. For example, the annotating unit 11 identifies the frame 102*a* corresponding to a time point $t_1$ depicted in FIG. 12 as the first image corresponding to the first time point for which it has been determined that the first region does not exist. The annotating unit 11 then sets the second region indicating a hazard region where a person (moving object 61) is obstructed at the position of the part of the object 1022 (bus) in the frame 102*a*, is likely to appear from behind the bus (object 1022) at the next time point after the time point $t_1$, and is expected to be hazardous for the vehicle in motion. The second region has substantially the same dimension as the first region in the frame 102*b* corresponding to the time point $t_2$ that is the next time point after the time point $t_1$ in the time series.

Then, the annotating unit 11 performs an attaching process of attaching the second annotation indicating the second region set in S103 (S104). For example, the annotating unit 11 attaches the second annotation indicating the second region set in S103 to the frame 102a corresponding to the time point $t_1$ depicted in FIG. 12. The annotating unit 11 then outputs, to the storage unit 30, as training data items, a plurality of images to which the second annotation is further attached.

In this way, the image processing apparatus 10 successfully performs image processing for autonomously attaching, to annotation-attached data items stored in the storage unit 20, another annotation that requires high-level recognition if it is done by workers and successfully outputs the resultant data items as training data items to the storage unit 30.

The image processing apparatus 10 performs the first extracting process (S90) and the second extracting process (S91) by using annotation-attached data items stored in the storage unit 20 in the above description; however, the configuration is not limited to this one. Specifically, annotation-attached data items are generated by letting crowdsourcing workers attach an annotation indicating a region representing a moving object that is present in respective images to all the images before the image processing apparatus 10 performs the first extracting process (S90) in the above description; however, the configuration is not limited to this one.

The image processing apparatus 10 may acquire all the consecutive time-series images that have been captured by the onboard camera and to which no annotation is attached and may perform the first extracting process (S90) on the all the acquired images. In this case, crowdsourcing workers may be caused to attach, to each of a plurality of images (first extracted images) extracted through the first extracting process, an annotation indicating a region representing a moving object that is present in the image. Specifically, crowdsourcing workers may be caused to attach an annotation indicating a region representing a moving object that is present in the first extracted images to the first extracted images selected through the first extracting process (S90) before the second extracting process (S91) is performed.

Advantageous Effects

As described above, according to the first embodiment, an image processing method and the like capable of reducing the variation in the quality of training data items including the plurality of images can be implemented.

Figure 13:
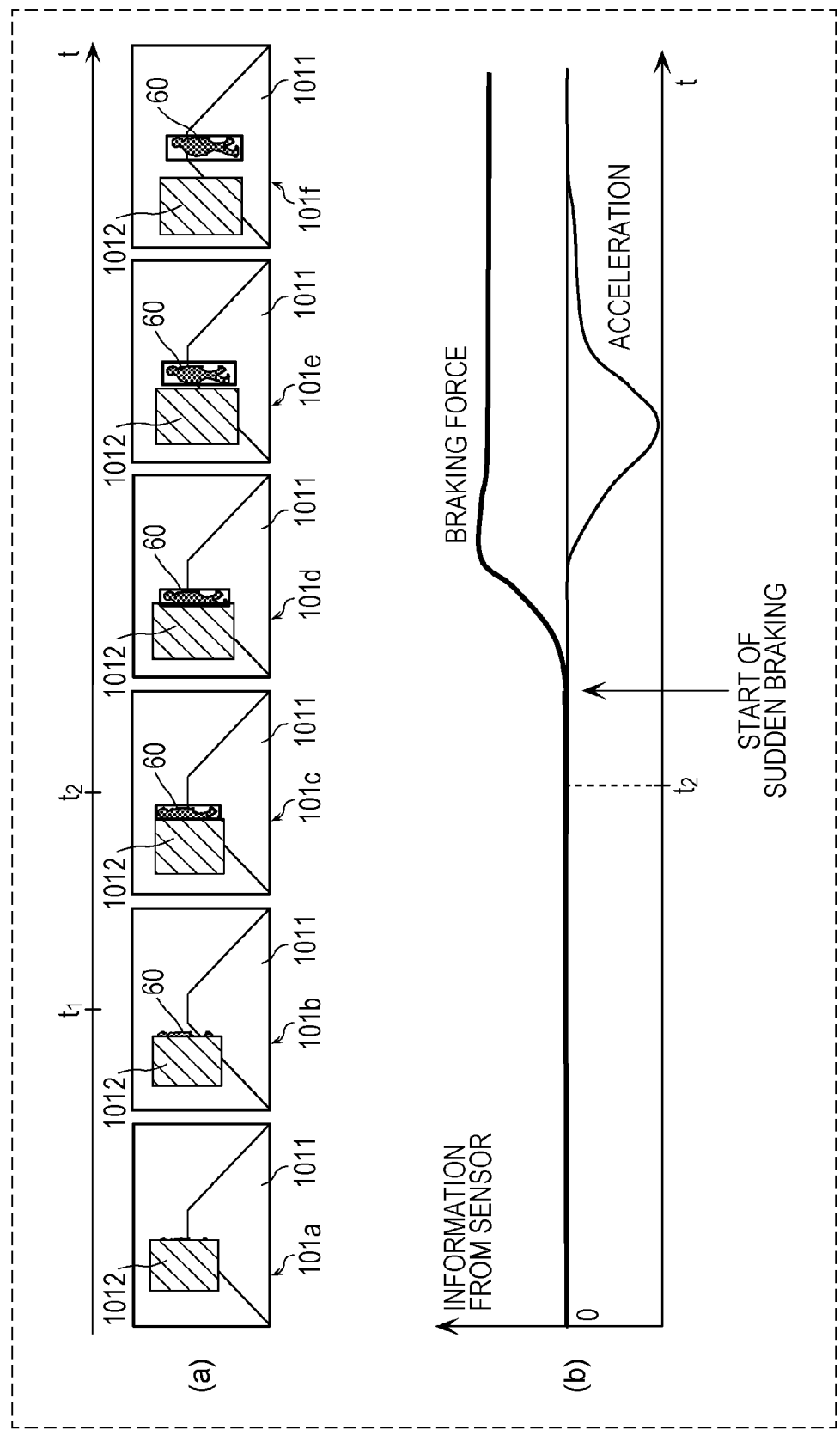
FIG. 13 is an explanatory diagram of advantageous effects provided by the first embodiment.

Advantageous effects provided by the image processing method and the like according to the first embodiment will be described with reference to FIG. 13. FIG. 13 is an explanatory diagram of advantageous effects of the first embodiment. A plurality of images depicted in FIG. 13(a) are an example of the plurality of consecutive time-series images obtained by capturing a scene ahead of a vehicle (in the traveling direction of the vehicle) by using an onboard camera mounted on the vehicle. FIG. 13(b) depicts braking force or acceleration that is associated with each of the plurality of images depicted in FIG. 13(a). The same reference signs are assigned to substantially the same components depicted in FIGS. 2 to 4, and a detailed description thereof is omitted.

FIG. 13(a) and FIG. 13(b) indicate that a driver of the vehicle in which the onboard camera is mounted brakes hard upon starting seeing a person (moving object 60) who comes out from behind the object 1012 in the frame 101c corresponding to the time point $t_2$ so as to avoid collision of the vehicle and acceleration changes in response to braking.

Accordingly, in order to notify the driver of the vehicle of a region (hazard region) that is likely to be hazardous for the vehicle in motion because a moving object, such as a person, suddenly corns out, it is necessary to perform a learning process by using images to which an annotation (correct information) indicating such a hazard region is attached.

However, in the case where crowdsourcing workers recognize such a hazard region at an object where a moving object such as a person is likely to suddenly come out and collide with the vehicle in motion and attach an annotation, the accuracy of the annotating task for setting a hazard region (for example, a frame representing the dimensions and the position) including a part of the object is likely to vary between workers because of the following reason. For example, recognizing a hazard region where the moving object 60 such as a person is likely to suddenly come out and collide with the vehicle in motion, for example, by viewing the frame 101b corresponding to the time pint t1 depicted in FIG. 13(a) requires high-level recognition, such as experiences and comparison with the image corresponding to the next time point.

On the other hand, in the case where the moving object 60 such as a person appears in images, such as in images (frames 101c to 101f) at and after the time point $t_2$ depicted in FIG. 13(a), the accuracy of the annotating task for attaching a hazard region representing the moving object 60 is unlikely to vary between crowdsourcing workers because of the following reason. Since workers can attach an annotation indicating the moving object 60 in the way the moving object 60 is seen in the images, such an annotating task does not require high-level recognition.

Thus, in the image processing method according to the first embodiment, attaching an annotation indicating a moving object, such as a person, that is visible in time-series images that have been captured by the onboard camera is performed by crowdsourcing workers, whereas attaching, to at least one image in time-series images, an annotation indicating a hazard region (second region) included in the at least one image where the moving object 60 such as a person is likely to suddenly come out and to be hazardous for the vehicle in motion is performed by a machine such as the image processing apparatus 10 or a computer that performs the image processing method. Specifically, a plurality of time-series images including at least one image to which the first annotation indicating a region (first region) representing a moving object such as a person who appears from behind an object on the path of the vehicle is attached are extracted from among the time-series images that have been captured by the onboard camera. Then, the first image corresponding to a first time point that does not include the first region is identified from among the plurality of images in reverse chronological order in the time series, and the second region including a part of an object in the identified image is set, and the second annotation indicating a hazard region (second region) is attached.

In the above-described manner, the image processing method and the like according to the first embodiment allow crowdsourcing workers to attach an annotation indicating a region representing a moving object that is present in each image. In addition, the image processing method and the like according to the first embodiment allow the second annotation indicating the second region, which requires high-level recognition if the annotation is attached by crowdsourcing workers, to be attached autonomously to the plurality of images that have been captured by the onboard camera. As a result, the image processing method and the like according to the first embodiment successfully reduce the variation in the quality of training data items including the plurality of images.

First Modification

In the first embodiment, a person is mentioned as an example of the moving object; however, the moving object is not limited to the person. The object may be a stationary vehicle, and the moving object may be a door of the stationary vehicle. In this case, the second region may have substantially the same dimensions as the first region. This case will be described specifically below with reference to FIGS. 14 and 15.

Figure 14:
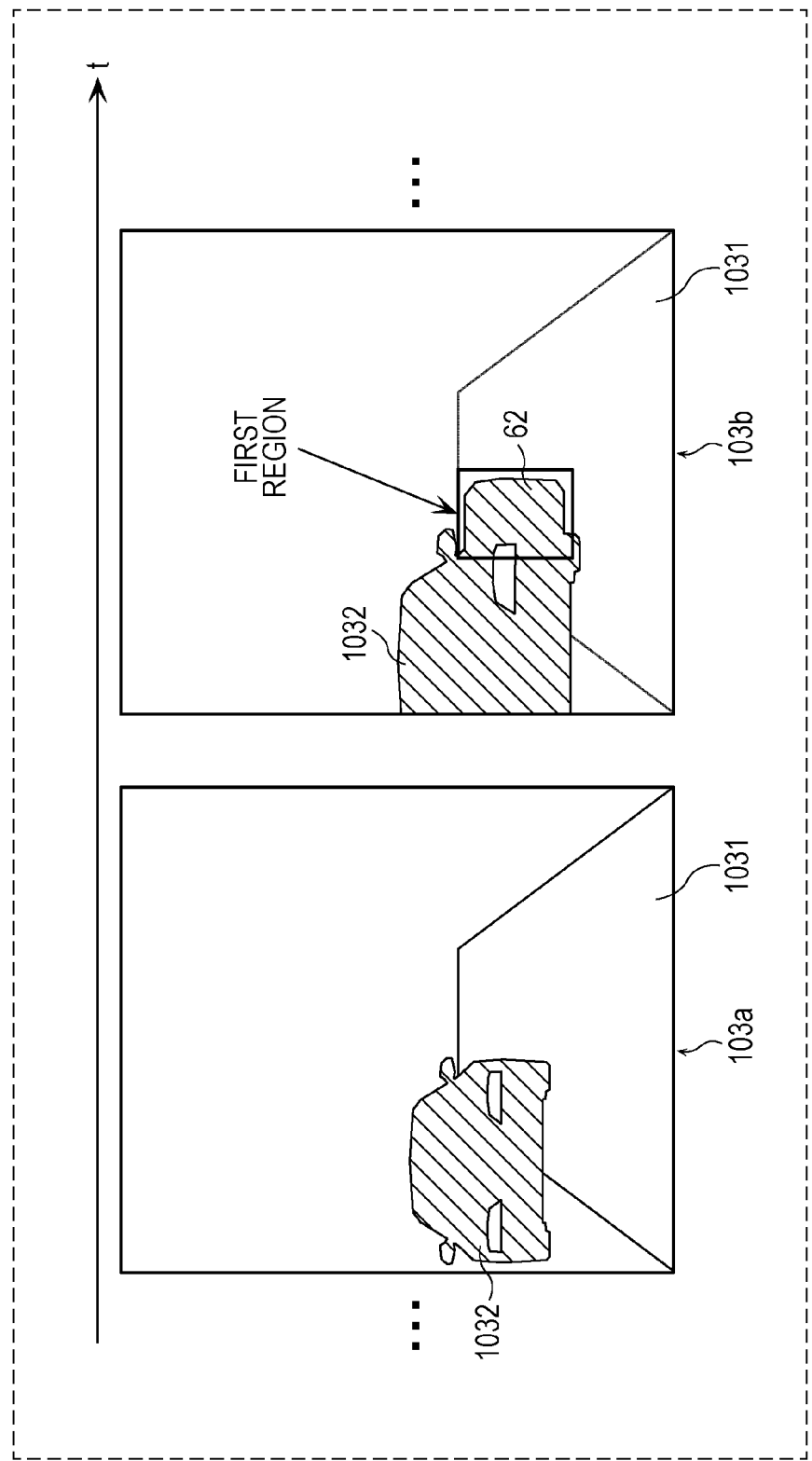
FIG. 14 is a diagram depicting an example of a plurality of images acquired by the annotating unit in a first modification.
Figure 15:
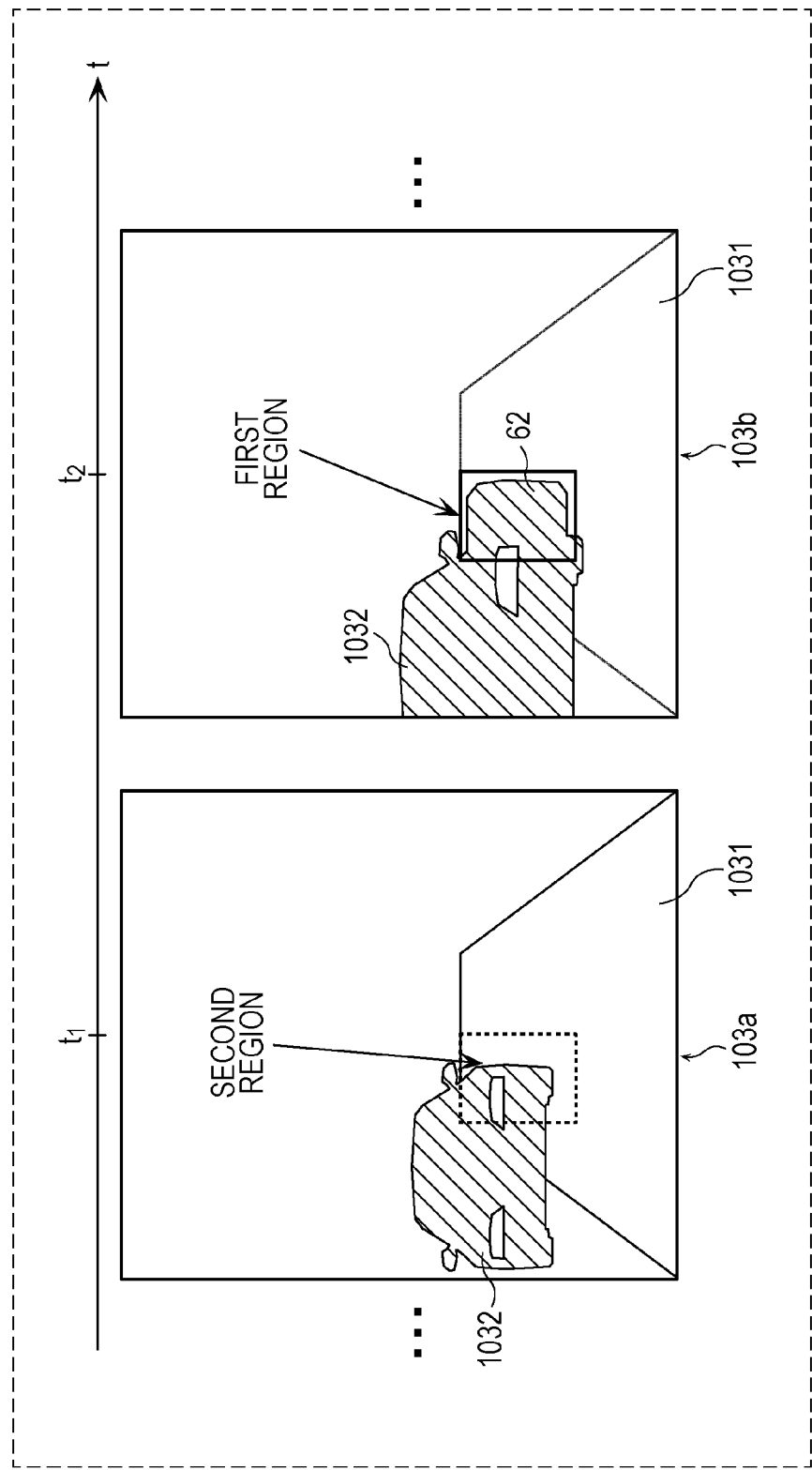
FIG. 15 is a diagram depicting an example of a second region set by the annotating unit in the first modification.

FIG. 14 is a diagram depicting an example of a plurality of images acquired by the annotating unit 11 according to a first modification. FIG. 15 is a diagram depicting an example of the second region set by the annotating unit 11 according to the first modification.

The annotating unit 11 according to the first modification acquires a plurality of images that include frames 103a, 103b, . . . , depicted in FIG. 14 and that include at least one frame including an object 1032, which is a stationary vehicle, and a moving object 62, which is a door of the vehicle, that is present in the vicinity of the object 1032 and on a road 1031 which is the path of the vehicle.

The annotating unit 11 according to the first modification also identifies the frame 103a corresponding to a time point $t_1$ depicted in FIG. 15, as the first image corresponding to the first time point for which it has been determined that the first region does not exist. Then, the annotating unit 11 according to the first modification sets the second region indicating a hazard region where the door (moving object 62) is obstructed at a position of (position including) a part of the object 1032, which is a stationary vehicle in the frame 103a, is to appear from the vehicle (object 1032) at the next time point of the time point $t_1$, and is expected to be hazardous for a vehicle in motion. As in the first embodiment, the second region is set to have substantially the same dimensions as the first region in the frame 103b corresponding to a time point $t_2$ that is the next time point after the time point $t_1$ in the time series.

In addition, the annotating unit 11 according to the first modification attaches the second annotation indicating the set second region to the frame 103a corresponding to the time point $t_1$ depicted in FIG. 15. The annotating unit 11 then outputs, as the training data items to the storage unit 30, the plurality of images including at least one image to which the second annotation is further attached.

In the above-described manner, the image processing method and the like according to the first modification enable the second region representing a door of a stationary vehicle to be set autonomously as a risk region involving a risk of collision when the vehicle is in motion and enable the second annotation representing the second region to be attached autonomously.

Second Modification

In the first modification, a door of a vehicle is mentioned as an example of the moving object; however, the moving object is not limited to a door of a vehicle. The moving object may be an object for a child to play with, such as a ball or a flying disc. In this case, the second region may have substantially the same dimensions as a region obtained by enlarging the first region in a height direction of the image corresponding to the first time point. An example case where the moving object is a ball will be described specifically below with reference to FIGS. 16 and 17.

Figure 16:
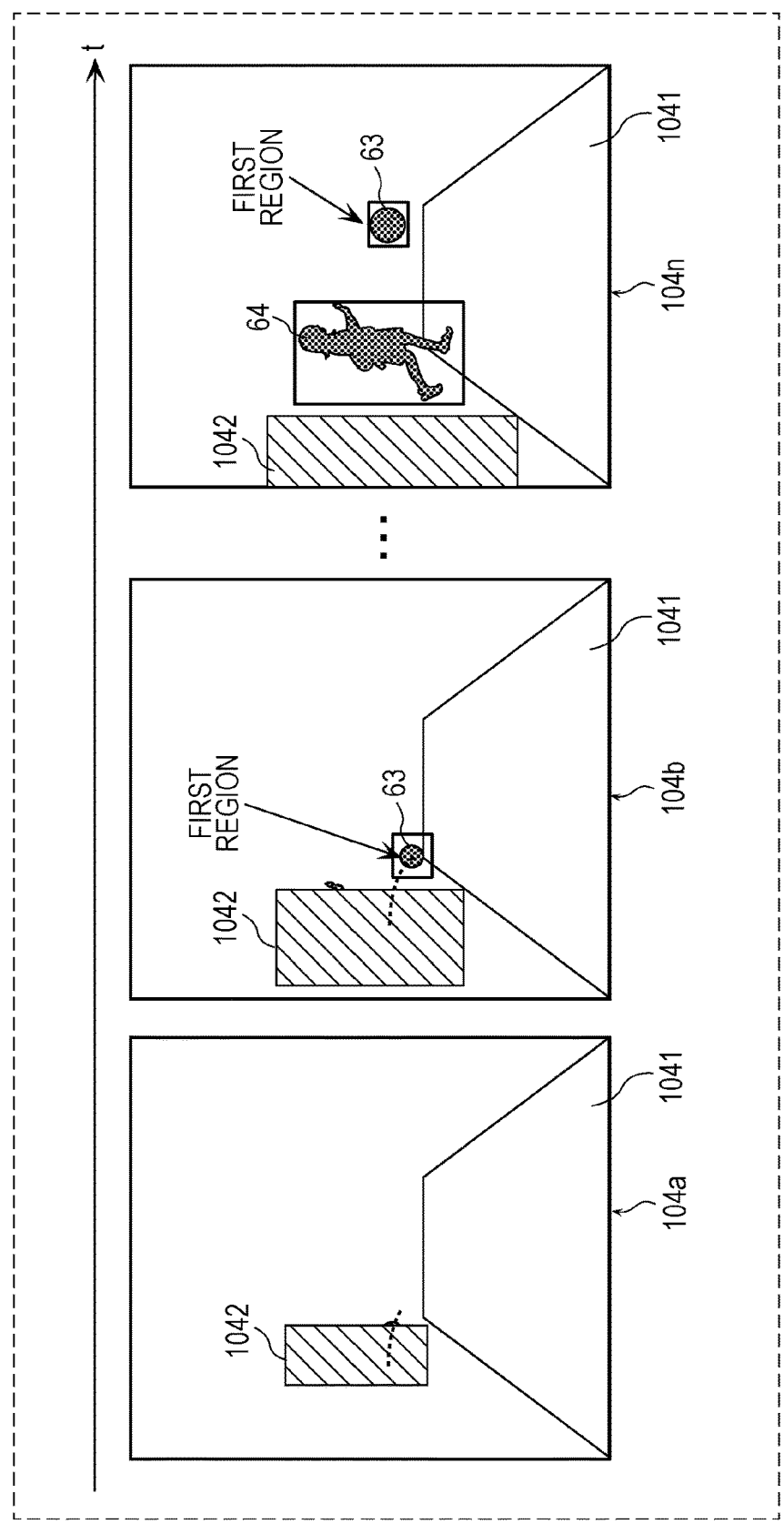
FIG. 16 is a diagram depicting an example of a plurality of images acquired by the annotating unit in a second modification.
Figure 17:
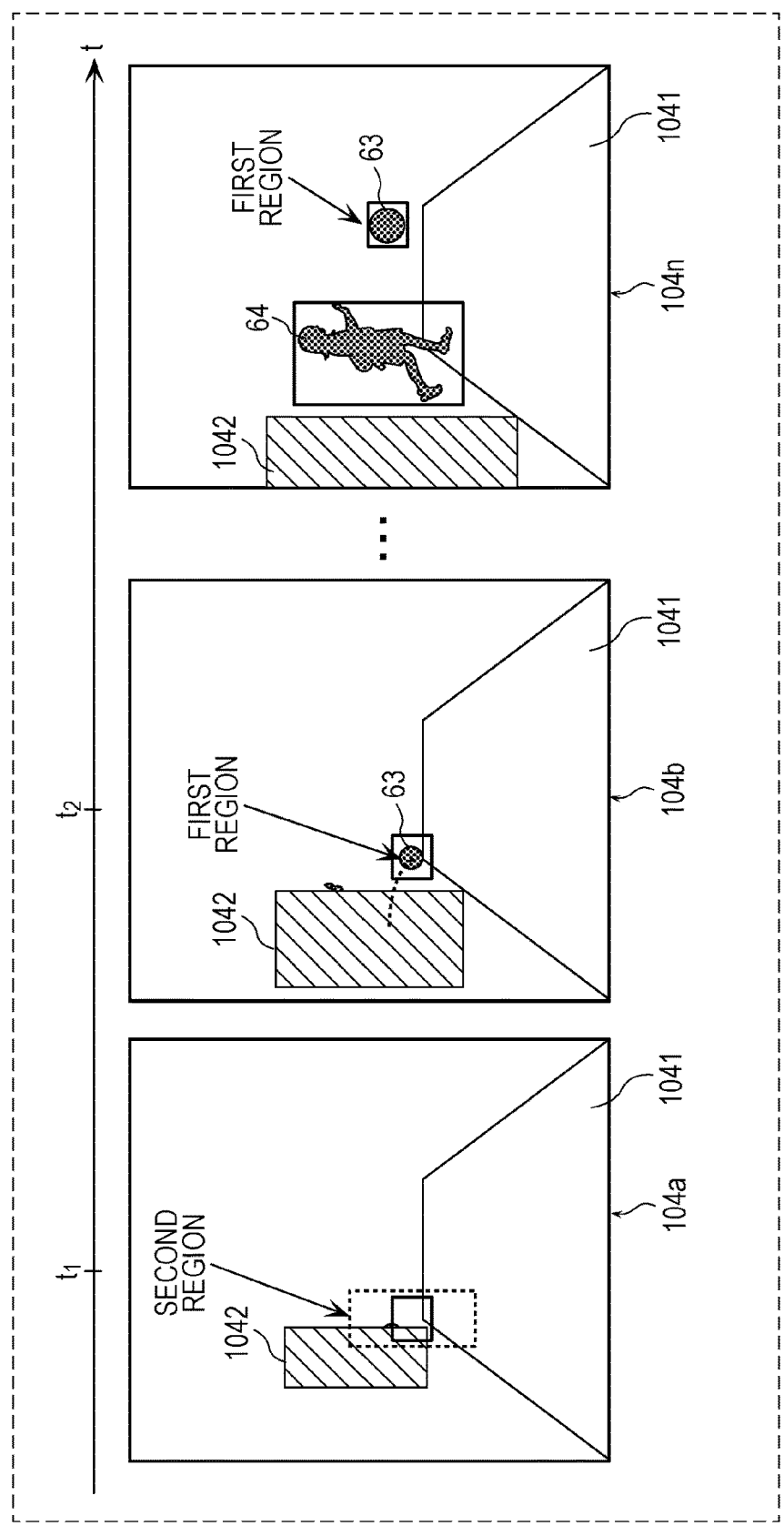
FIG. 17 is a diagram depicting an example of a second region set by the annotating unit in the second modification.

FIG. 16 is a diagram depicting an example of a plurality of images acquired by the annotating unit 11 according to a second modification. FIG. 17 is a diagram depicting an example of the second region set by the annotating unit 11 according to the second modification.

The annotating unit 11 according to the second modification acquires a plurality of images that include frames 104a, 104b, . . . , 104n depicted in FIG. 16 and that include at least one frame including an object 1042 and a moving object 63 which is a ball that is present in the vicinity of the object 1042 and on a road 1041 which is the path of the vehicle. Note that the plurality of images acquired by the annotating unit 11 according to the second modification may or may not include the frame 104n additionally including a moving object 64 which is a child.

The annotating unit 11 according to the second modification also identifies the frame 104a corresponding to a time point $t_1$ depicted in FIG. 17 as the first image corresponding to the first time point for which it has been determined that the first region does not exist. The annotating unit 11 according to the second modification then sets the second region indicating a hazard region that is hazardous for a vehicle in motion because the ball (moving object 63) is obstructed at a position of (including) a part of the object 1042 in the frame 104a and is to appear from behind the object 1042 corresponding to the next time point after the time point $t_1$ and thus a child is to appear thereafter. In the second modification, the second region is set to have substantially the same dimensions as the moving object 64 which is a child that is present in the vicinity of the moving object 63 that is a ball, unlike the first embodiment. That is, the second region is set to have substantially the same dimensions as a region obtained by enlarging the first region in the frame 104b corresponding to the time point $t_2$ that is the next time point after the time point $t_1$ in the time series in the height direction of the frame 104a corresponding to the time point $t_1$. In addition, the enlarging ratio in the height direction is determined based on a height of a path of the moving object 63 which is a ball.

The annotating unit 11 according to the second modification also attaches the second annotation indicating the set second region to the frame 104a corresponding to the time point $t_1$ depicted in FIG. 17. The annotating unit 11 then outputs, as the training data items to the storage unit 30, the plurality of images including at least one image to which the second annotation is attached.

In the above-described manner, the image processing method and the like according to the second modification enable the second region representing an object for a child to play with to be set autonomously as a risk region involving a risk of collision with a child when the vehicle is in motion and enable the second annotation representing the second region to be attached autonomously.

Third Modification

In the first embodiment, the onboard camera has been described to be a front camera; however, the onboard camera is not limited to such a camera. The onboard camera may be a side camera that captures a scene on the left or right side of the vehicle that is moving forward.

If the onboard camera is a front camera and a moving object appears in front of the vehicle, such as a case where a person suddenly comes out in front of the vehicle, the moving object appears to move toward the center in time-series images captured by such an onboard camera. On the other hand, a stationary object appears to move from the center toward the periphery in the time-series images captured by such an onboard camera.

In contrast, if the onboard camera according to the third modification is a left camera and the moving object appears on the left side of the vehicle, the moving object appears to move toward the right in time-series images captured by such an onboard camera. On the other hand, a stationary object appears to move from the right side to the left in the time-series images captured by such an onboard camera.

Accordingly, if the onboard camera is a side camera, such as a left camera, and a person who is riding a bicycle that is moving along the vehicle and is catching up or overtaking the vehicle is handed as the moving object, the second annotation indicating the second region that requires high-level recognition is successfully attached autonomously as described in the first embodiment.

An operation performed by the annotating unit 11 according to the third modification will be described below with reference to FIGS. 18 and 19 on the assumption that the moving object is a person who is riding a bicycle that is moving along a vehicle and is catching up or overtaking the vehicle.

Figure 18:
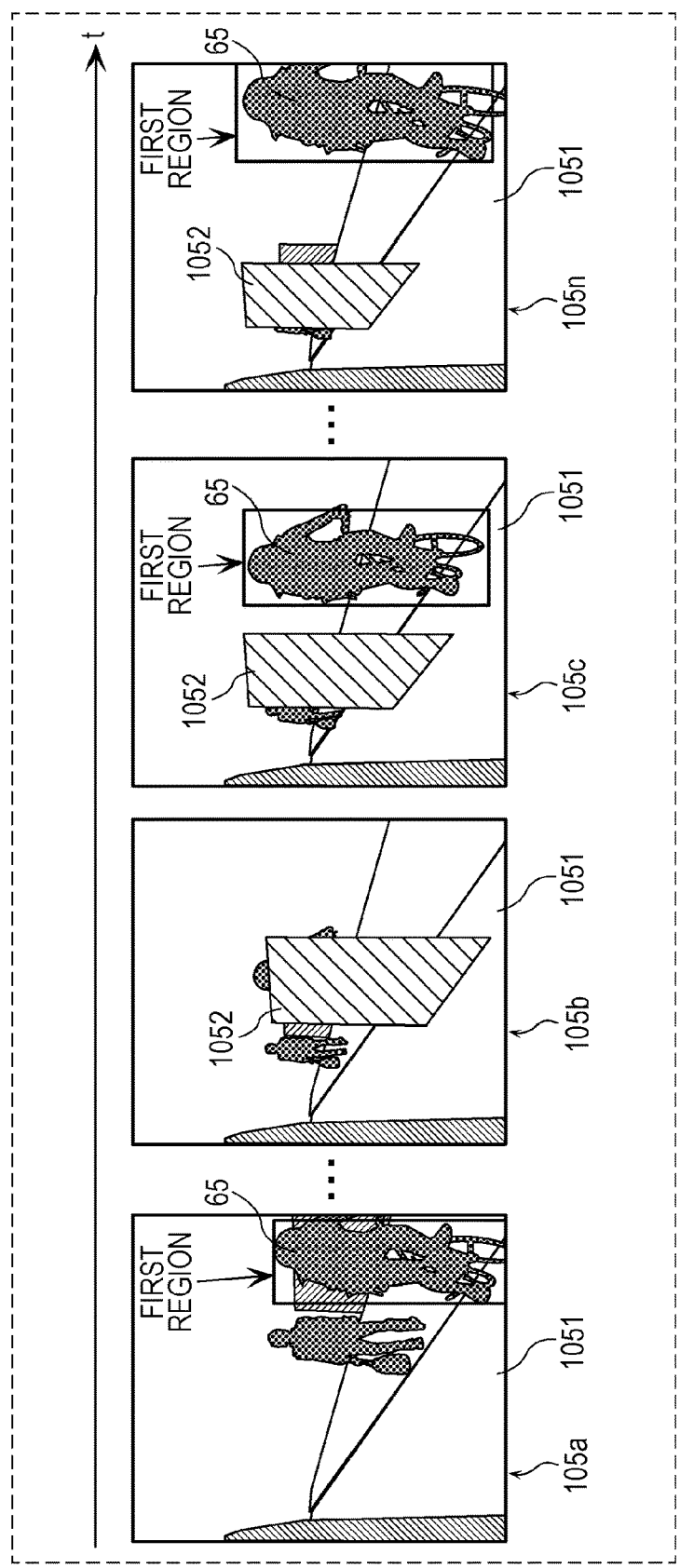
FIG. 18 is a diagram depicting an example of a plurality of images acquired by the annotating unit in a third modification.

FIG. 18 is a diagram depicting an example of a plurality of images acquired by the annotating unit 11 according to the third modification. FIG. 19 is a diagram depicting an example of the second region set by the annotating unit 11 according to the third modification.

The annotating unit 11 according to the third modification acquires a plurality of images that include frames 105a, 105b, 105c, . . . , and 105n depicted in FIG. 18 and that include at least one frame including an object 1052 and a moving object 65 which is a person who is riding a bicycle that is present in the vicinity of the object 1052 and on a road 1051 which is the path of the vehicle. The plurality of images acquired by the annotating unit 11 according to the third modification may or may not include the frame 105a not including the object 1052.

Figure 19:
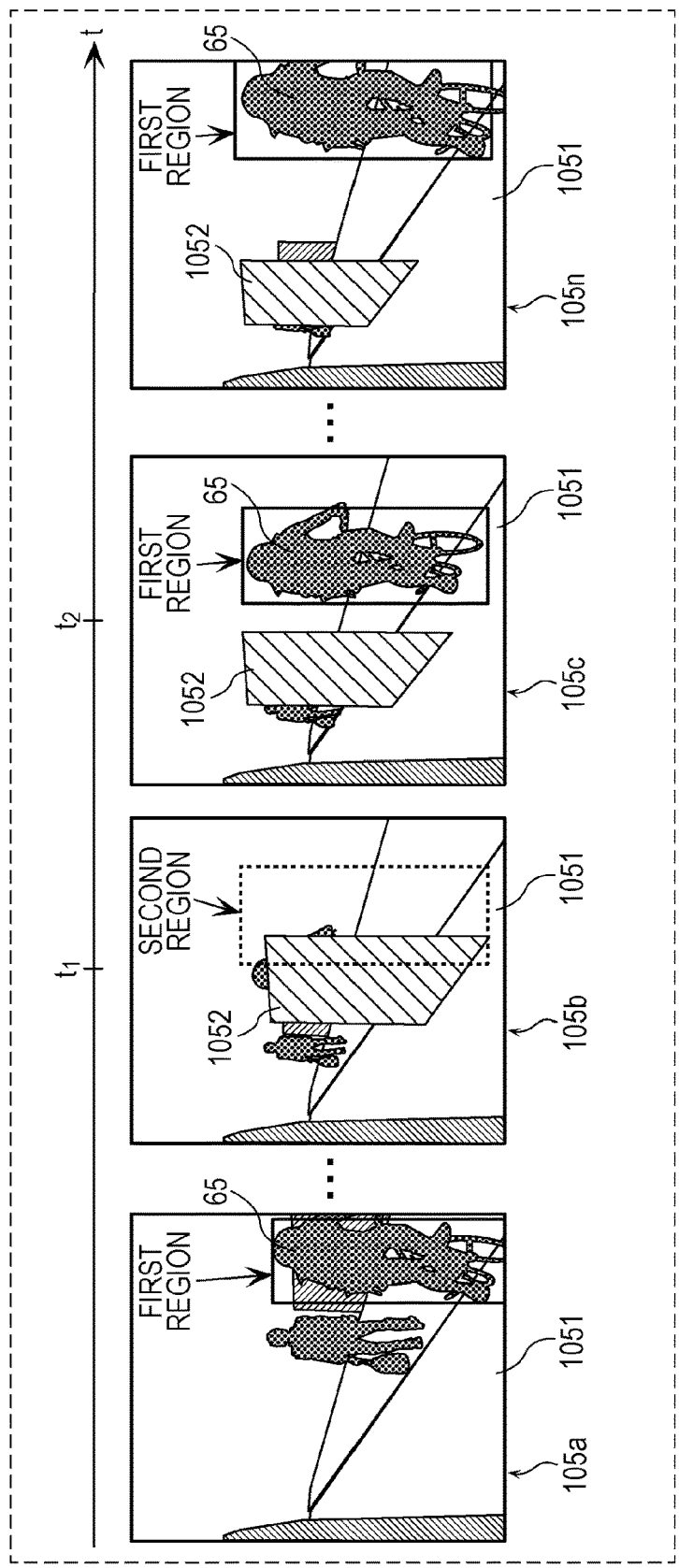
FIG. 19 is a diagram depicting an example of a second region set by the annotating unit in the third modification.

In addition, the annotating unit 11 according to the third modification identifies the frame 105b corresponding to a time point $t_1$ depicted in FIG. 19 as the first image corresponding to the first time point for which it has been determined that the first region does not exist. The annotating unit 11 according to the third modification then sets the second region indicating a hazard region involving a risk of the vehicle hitting the moving object 65 which is a person who is riding a bicycle because the moving object 65 is obstructed at a position of (including) a part of the object 1052 in the frame 105b and is to appear from behind the object 1052 at the next time point after the time point $t_1$. As in the first embodiment, the second region is set to have substantially the same dimensions as the first region in the frame 105c corresponding to a time point $t_2$ that is the next time point after the time point $t_1$ in the time series.

The annotating unit 11 according to the third modification also attaches the second annotation indicating the set second region to the frame 105b corresponding to the time point $t_1$ depicted in FIG. 19. The annotating unit 11 then outputs, as the training data items to the storage unit 30, the plurality of images including at least one image to which the second annotation is attached.

As described above, according to the third modification, the onboard camera may be a side camera, and the second annotation indicating the second region that requires high-level recognition can be attached autonomously to a plurality of images that have been captured by the onboard camera that is a side camera.

Fourth Modification

In the first embodiment and the first to third modifications, the description has been given of the case where the annotating unit 11 sets the second region and attaches the second annotation indicating the set second region; however, the configuration is not limited to this case. The annotating unit 11 may further set a hazard level for the second region in addition to setting the second region that is a hazard region for a vehicle in motion. In this case, the annotating unit 11 may attach a second annotation indicating a second region that is a hazard region for a vehicle in motion and indicating the hazard level for the second region. A method for setting the hazard level of the second region will be described specifically below.

First Example of Hazard-Level Setting Method

Figure 20:
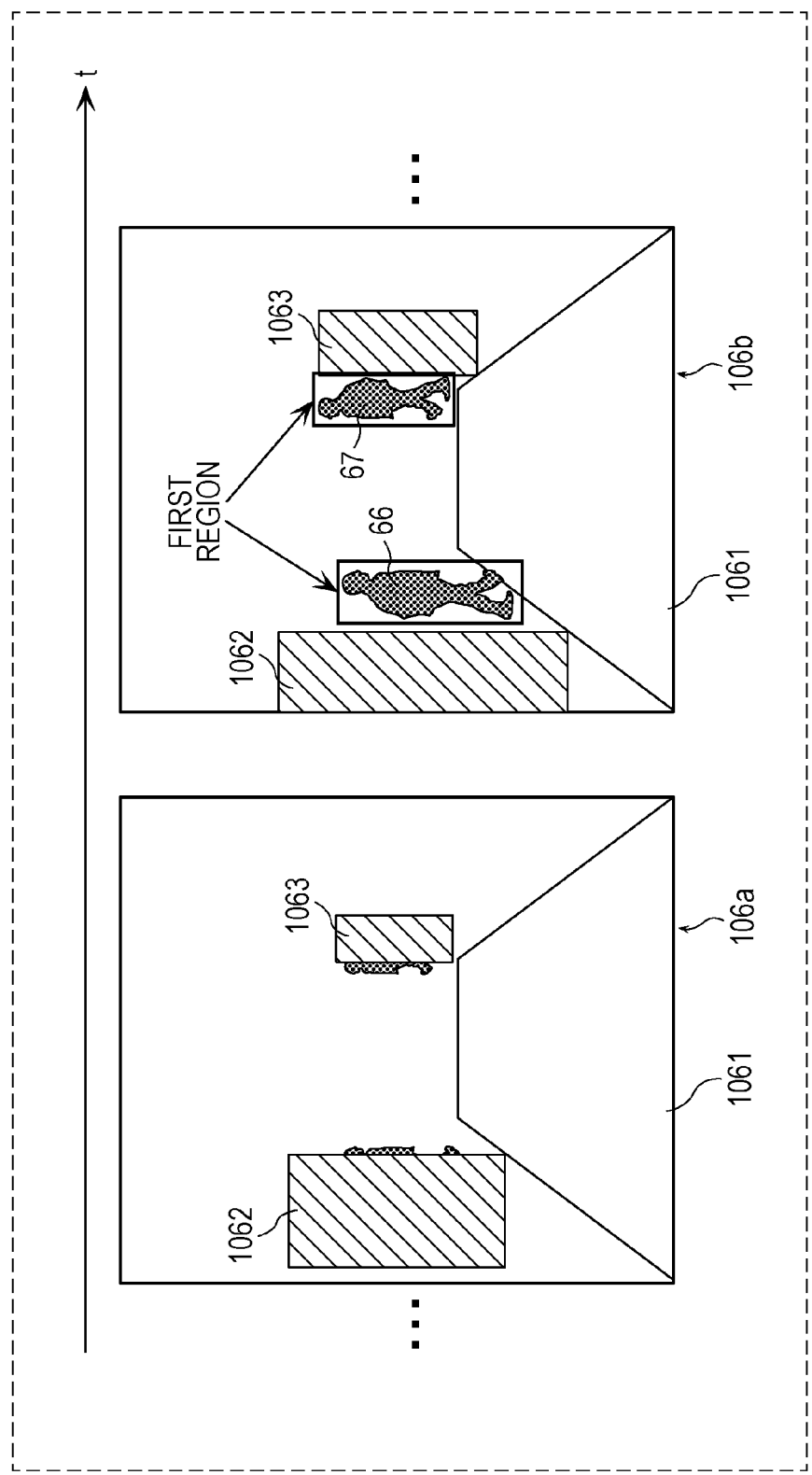
FIG. 20 is a diagram depicting an example of a plurality of images acquired by the annotating unit during an acquiring process in a first example of a fourth modification.
Figure 21:
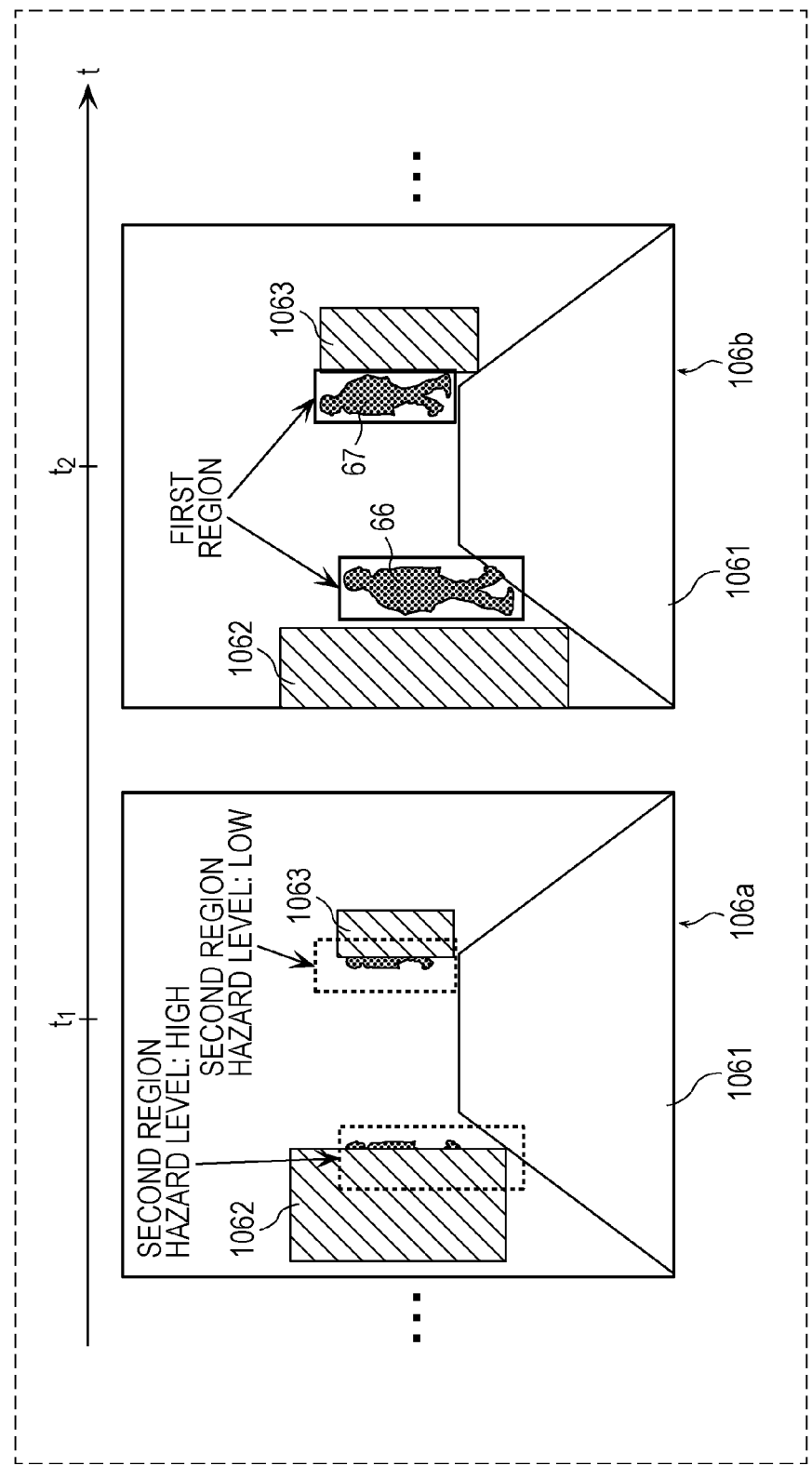
FIG. 21 is a diagram depicting an example of a second annotation attached by the annotating unit in the first example of the fourth modification.

FIG. 20 is a diagram depicting an example of a plurality of images acquired through the acquiring process by the annotating unit 11 according to a first example of a fourth modification. FIG. 21 is a diagram depicting an example of a second annotation attached by the annotating unit 11 according to the first example of the fourth modification.

The annotating unit 11 according to the first example of the fourth modification acquires a plurality of images including frames 106a, 106b, depicted in FIG. 20. The plurality of images depicted in FIG. 20 include at least one frame including objects 1062 and 1063, a moving object 66 which is a person who is present in the vicinity of the object 1062 and on a road 1061 which is the path of the vehicle, and a moving object 67 which is a person who is present in the vicinity of the object 1063 and on the road 1061 which is the path of the vehicle.

The annotating unit 11 according to the first example of the fourth modification also identifies the frame 106a corresponding to a time point $t_1$ depicted in FIG. 21 as the first image corresponding to the first time point for which it has been determined that the first region does not exist. The annotating unit 11 then sets the second region indicating a hazard region involving a risk of the vehicle in motion colliding with the moving object 66 or 67 because the moving objects 66 and 67 are obstructed at positions of (including) parts of the objects 1062 and 1063 in the frame 106a and are to appear from behind the objects 1062 and 1063 at the next time point after the time point $t_1$, respectively. As in the first embodiment, the second region is set to have substantially the same dimensions as the corresponding first region in the frame 106b corresponding to a time point $t_2$ that is the next time point after the time point $t_1$ in the time series. The annotating unit 11 further sets the hazard level in accordance with the dimensions of the set second region. In the example depicted in FIG. 21, the first region indicating the moving object 66 is larger than the first region indicating the moving object 67. Accordingly, the annotating unit 11 sets a higher hazard level for the second region corresponding to the first region representing the moving object 66 than for the second region corresponding to the first region representing the moving object 67 because of the following reason. For example, since actual dimensions of people are handled to be substantially equal, it can be considered that a person is present closer to the vehicle in motion and is more hazardous if the person in the image is large.

The annotating unit 11 also attaches the second annotation indicating the second region and the hazard level of the second region that have been set in the above manner, to the frame 106a corresponding to the time point $t_1$ depicted in FIG. 21. That is, in the first example of the fourth modification, the annotating unit 11 additionally includes the hazard level that takes a larger value as the second region increases in the attached second annotation indicating the second region.

Note that the value of the hazard level can be set in accordance with a ratio between the maximum areas of the second regions (areas of the frames) or a ratio between the dimensions of moving objects, such as persons, represented by the first regions corresponding to the second regions, for example.

Second Example of Hazard-Level Setting Method

Figure 22:
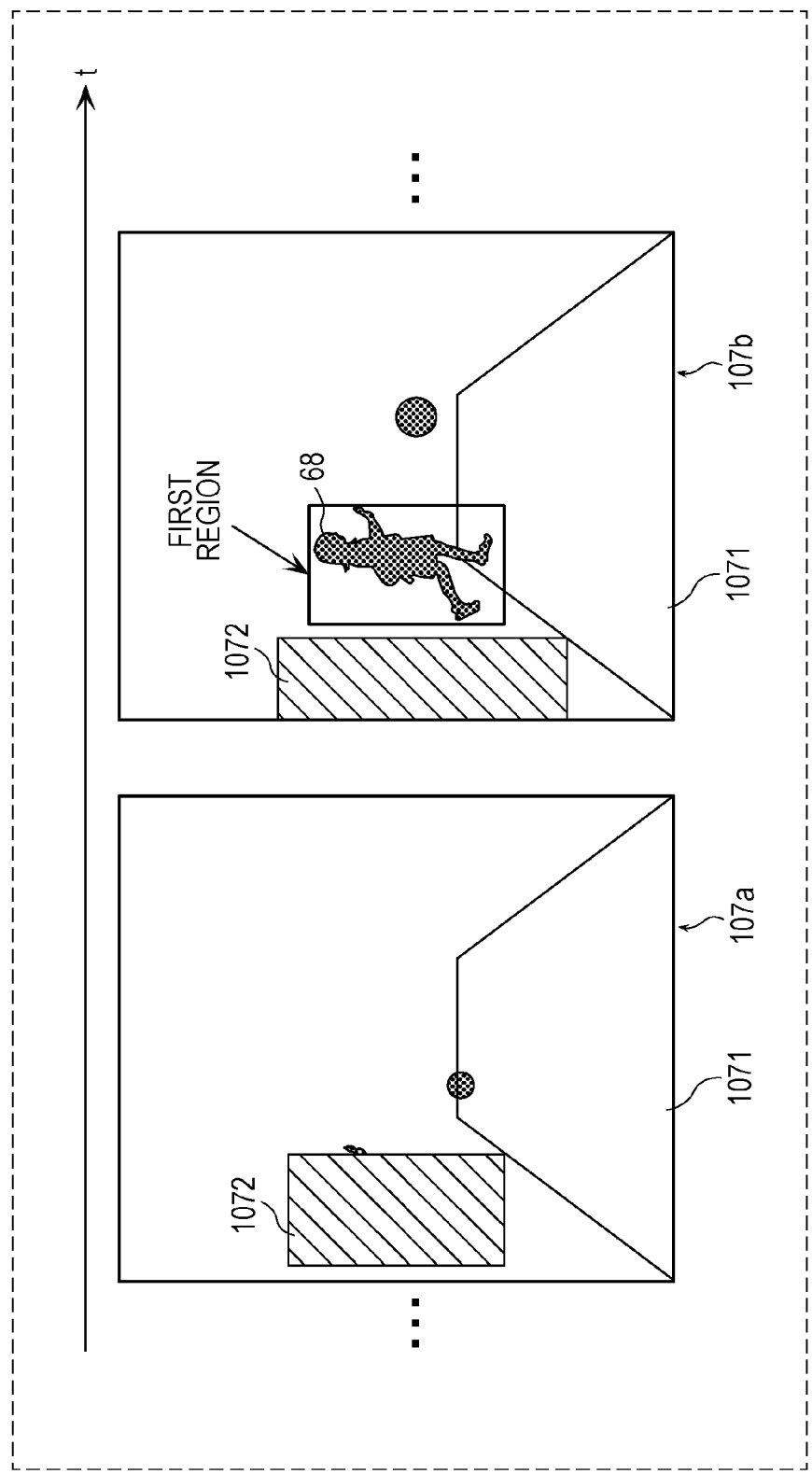
FIG. 22 is a diagram depicting an example of a plurality of images acquired by the annotating unit in a second example of the fourth modification.
Figure 23:
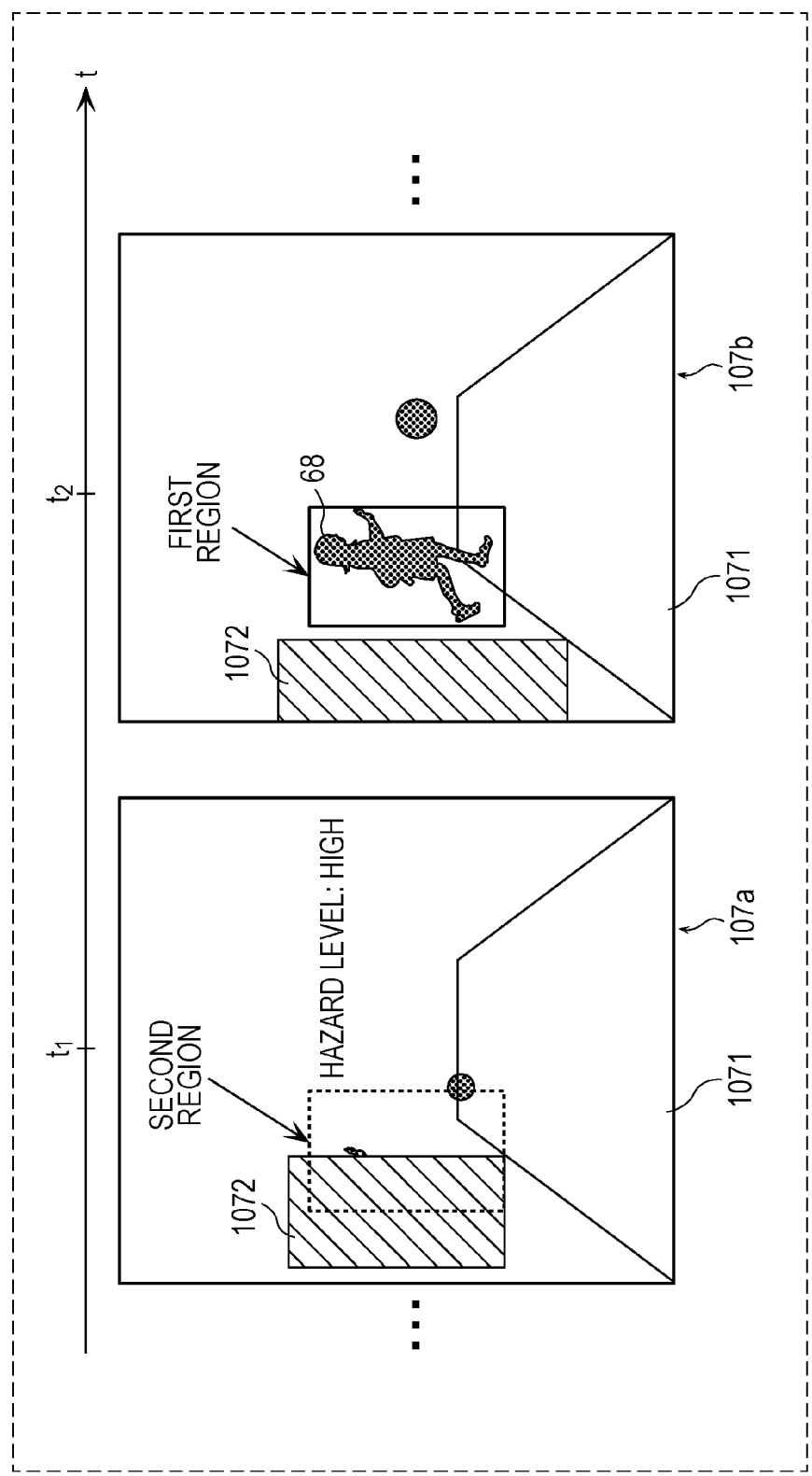
FIG. 23 is a diagram depicting an example of a second annotation attached by the annotating unit in the second example of the fourth modification.

FIG. 22 is a diagram illustrating an example of a plurality of images acquired by the annotating unit 11 according to a second example of the fourth modification. FIG. 23 is a diagram illustrating an example of a second annotation attached by the annotating unit 11 according to the second example of the fourth modification.

The annotating unit 11 according to the second example of the fourth modification acquires a plurality of images including frames 107a, 107b, . . . depicted in FIG. 22. The plurality of images depicted in FIG. 22 include at least one frame including an object 1072 and a moving object 68 which is a child who is present in the vicinity of the object 1072 and on a road 1071 which is the path of the vehicle.

The annotating unit 11 according to the second example of the fourth modification also identifies the frame 107a corresponding to a time point $t_1$ depicted in FIG. 23 as the first image corresponding to the first time point for which it has been determined that the first region does not exist. The annotating unit 11 then sets the second region indicating a hazard region that is likely to be hazardous for a vehicle in motion because the moving object 68 is obstructed at a position of (including) a part of the object 1072 in the frame 107a and is to appear from behind the object 1072 at the next time point after the time t1. As in the first embodiment, the second region is set to have substantially the same dimensions as the corresponding first region in the frame 107b corresponding to the time point $t_2$ that is the next time point after the time point $t_1$ in the time series. The annotating unit 11 sets the hazard level of the second region in accordance with an attribute of the moving object represented by the first region corresponding to the second region. In the example depicted in FIG. 23, the hazard level is set to be high since the moving object represented by the first region is a child because of the following reason. It can be considered that, if the attribute of the moving object indicates children, children are more likely to suddenly come out in front of the vehicle in motion and is more hazardous. In addition, the hazard level may be increased in the order of children and elderly people, adults, other vehicles, and objects such as a ball (children and elderly people>adults>other vehicles>objects such as a ball).

The annotating unit 11 attaches the second annotation indicating the second region and the hazard level of the second region that are set in the above manner to the frame 107a corresponding to the time point $t_1$ depicted in FIG. 23. That is, in the second example of the fourth modification, the annotating unit 11 additionally includes the hazard level based on the attribute of the moving object represented by the first region corresponding to the second region in the attached second annotation.

Third Example of Hazard-Level Setting Method

Note that the hazard-level setting method is not limited to the case where the hazard level is based on the plurality of images acquired by the annotating unit 11 as described above. The hazard level may be set on the basis of information representing braking force or acceleration of a vehicle that is associated with the plurality of images.

Figure 24:
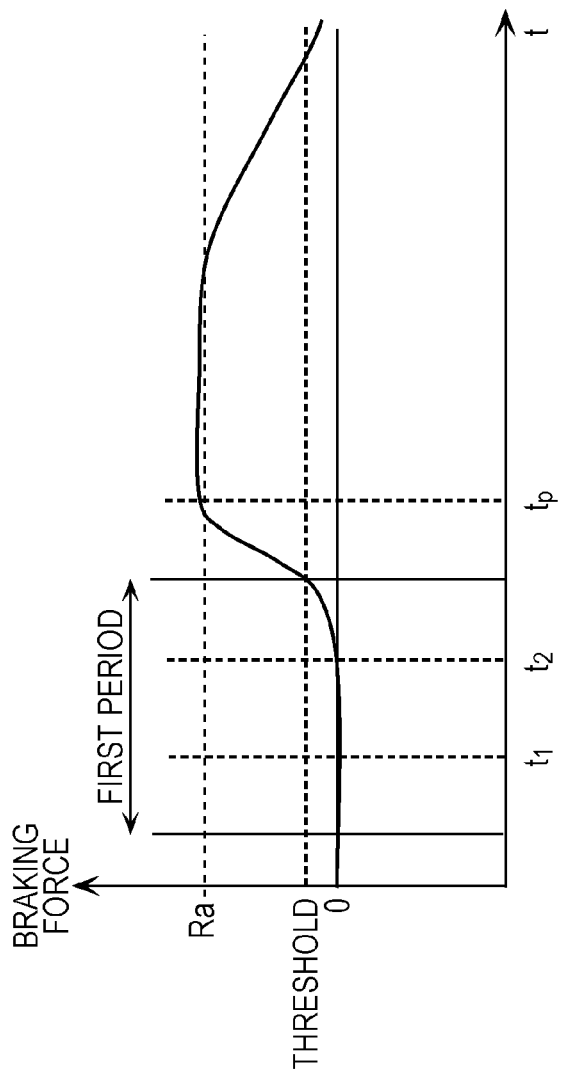
FIG. 24 is an explanatory diagram of a method for determining a hazard level attached by the annotation unit in a third example of the fourth modification.

FIG. 24 is an explanatory diagram of a method for setting a hazard level attached by the annotating unit 11 according to a third example of the fourth modification. The same reference signs are assigned to the same or substantially the same components as those depicted in FIG. 7, and a detailed description is omitted.

The annotating unit 11 according to the third example of the fourth modification identifies the first image corresponding to the first time point (time point $t_1$) for which it has been determined that the first region does not exist. The annotating unit 11 then sets the second region indicating a hazard region that is likely to be hazardous for a vehicle in motion because the moving object is obstructed at a position of (including) a part of the object in the identified first image corresponding to the time point $t_1$ and is to appear from behind the object at the next time point after the time point $t_1$. The annotating unit 11 sets the hazard level of the second region in accordance with the braking force or acceleration at a time point at which the braking force or acceleration of the vehicle represented by information associated with the plurality of images is larger than a threshold. Specifically, the annotating unit 11 sets the hazard level based on the largest braking force Ra (braking force Ra corresponding to a time point $t_p$ in FIG. 24) in response to the actual occurrence of a risk, instead of the hazard level based on the braking force at the identified time point $t_1$ (the same timing as that of the identified image) as depicted in FIG. 24. FIG. 24 depicts an example case where the vertical axis represents the braking force; however, the vertical axis is not limited to this parameter and may be an amount of operation on a steering wheel for avoidance or acceleration of the vehicle.

As described above, the image processing method and the like according to the fourth modification enable the hazard level of the second region to be additionally included in the second annotation representing the second region which is a hazard region that is likely to be hazardous for a vehicle in motion.

Second Embodiment

In the first embodiment, the description has been given of the case where crowdsourcing workers are caused to attach an annotation indicating a moving object, such as a person, visible in time-series images that have been captured by an onboard camera; however, since the quality achieved by the workers is not constant, there may be cases where an annotation indicating the first region representing the moving object is not attached to some of the time-series images that have been captured by the onboard camera even if the moving object, such as a person, is visible in the images.

This case will be described below as a second embodiment in terms of differences from the first embodiment.

Configuration of Image Processing Apparatus 10A

An image processing apparatus 10A (not depicted) according to the second embodiment differs from the image processing apparatus 10 according to the first embodiment in the configuration of a determining unit 112A of an annotating unit 11A (not depicted). Since the rest of the configuration is substantially the same as that of the image processing apparatus 10 according to the first embodiment, a description thereof is omitted.

Determining Unit 112A

Figure 25:
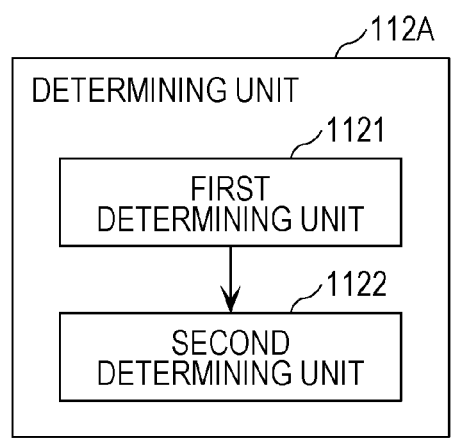
FIG. 25 is a diagram depicting an example of a detailed configuration of a determining unit according to a second embodiment.

FIG. 25 is a diagram illustrating an example of a detailed configuration of the determining unit 112A according to the second embodiment.

The determining unit 112A determines, for each of a plurality of images acquired by the acquiring unit 111, in reverse chronological order from an image corresponding to the last time point in the time series, whether a first region exists in the image on the basis of whether a first annotation is attached to the image.

In the second embodiment, the determining unit 112A determines, in reverse chronological order from the image corresponding to the last time point in the time series, the first image to which the first annotation is not attached from among the plurality of images acquired by the acquiring unit 111. The determining unit 112A determines, in reverse chronological order from the image corresponding to the third time point, through image processing, whether the first region exists at a position in each of the images that is obtained by shifting the first region in the image corresponding to the next time point after a third time point of the determined first image in a direction from the first region toward the object.

Operation of Image Processing Apparatus 10A

An operation performed by the image processing apparatus 10A configured in the above manner will be described next with reference to FIGS. 26 to 29.

Figure 26:
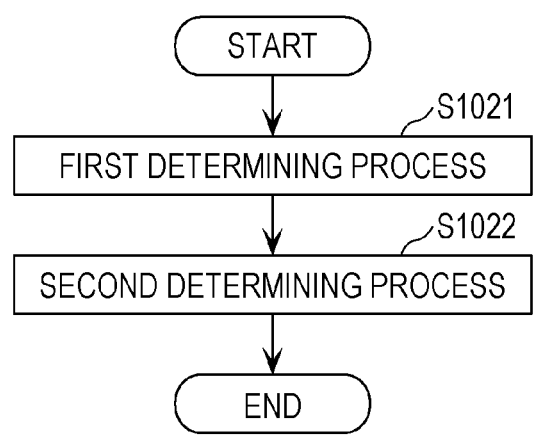
FIG. 26 is a flowchart describing an operation performed by the determining unit of an image processing apparatus according to the second embodiment.
Figure 27:
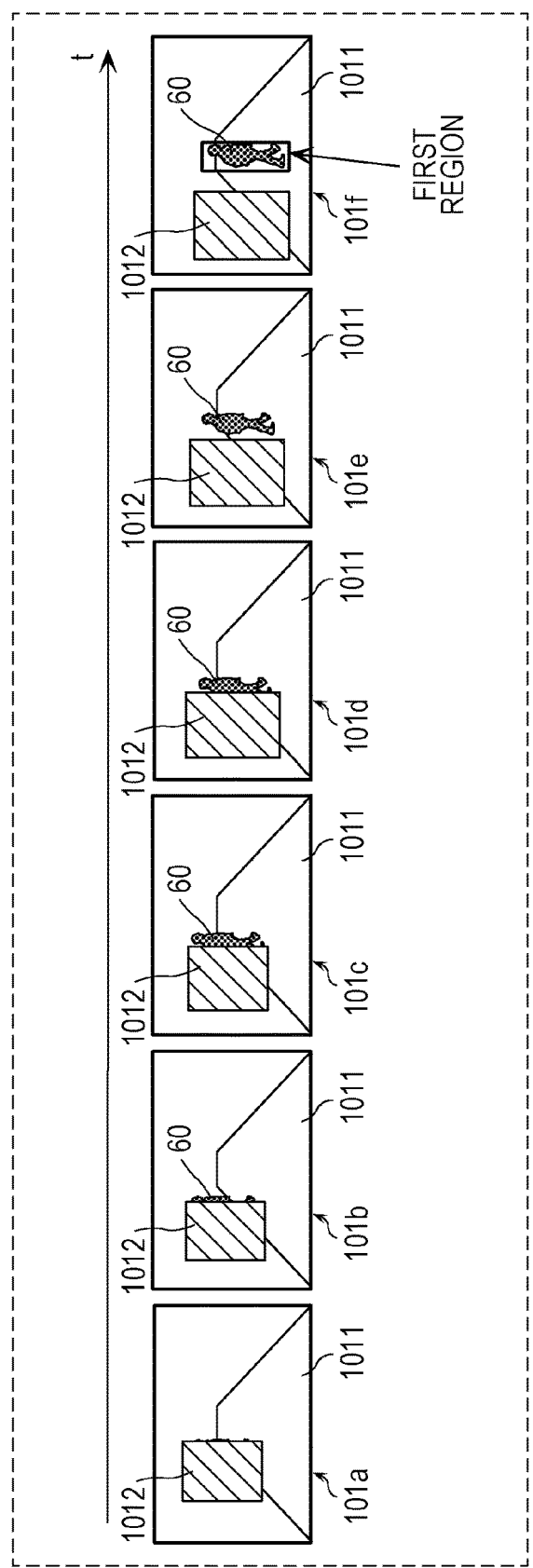
FIG. 27 is a diagram depicting an example of a plurality of images acquired by an acquiring unit in the second embodiment.
Figure 28:
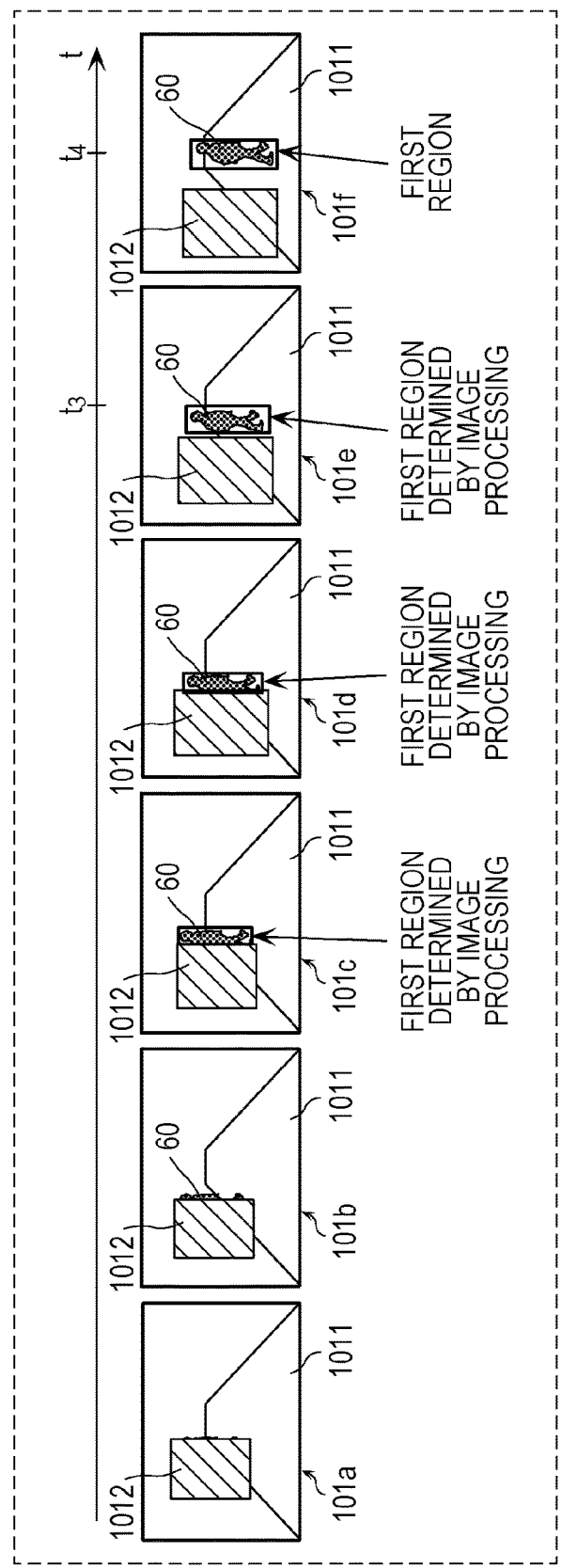
FIG. 28 is an explanatory diagram of image processing performed by the determining unit on the plurality of images depicted in FIG. 27 in the second embodiment.

FIG. 26 is a flowchart describing an operation performed by the determining unit 112A of the image processing apparatus 10A in the second embodiment. FIG. 27 is a diagram depicting an example of a plurality of images acquired by the acquiring unit 111 in the second embodiment. FIG. 28 is an explanatory diagram of image processing performed by the determining unit 112A on the plurality of images depicted in FIG. 27 in the second embodiment. The same reference signs are assigned to the same or substantially the same components as those depicted in FIGS. 2 to 4, and a detailed description thereof is omitted.

First, the acquiring unit 111 of the image processing apparatus 10A acquires a plurality of images, which are annotation-attached data items, from the storage unit 20. In the second embodiment, the plurality of images acquired by the acquiring unit 111 are not assigned a first region (first annotation) indicating the moving object 60, which is a person, even if the moving object 60 is visible in some of the plurality of images. In the example depicted in FIG. 27, the first region is not assigned even if the moving object 60, which is a person, is visible in some of the images (frames 101c, 101d, and 101e).

Then, as depicted in FIG. 26, the determining unit 112A performs a first determining process of determining the first image to which the first annotation is not attached from among the plurality of images acquired by the acquiring unit 111 in reverse chronological order from the image corresponding to the last time point in the time series (S2021). For example, the determining unit 112A determines the frame 101e which is the first image to which the first annotation, that is, the first region is not attached from among the plurality of images (frames 101a to 101f) depicted in FIG. 27 in reverse chronological order from the frame 101f which is the image corresponding to the last time point in the time series.

Then, the determining unit 112A performs a second determining process of determining, through image processing, whether the first region exists at a position in each of the images that is obtained by shifting the first region in the image corresponding to the next time point after the third time point of the determined first image in the direction from the first region toward the object in the image in reverse chronological order from the image corresponding to the third time point (S1022). For example, as depicted in FIG. 28, the determining unit 112A determines, through image processing, whether the first region exists at a position in each of the images (frames 101e to 101a) that is obtained by shifting the first region in the frame 101f corresponding to the next time point $t_4$ after the time point $t_3$ which is the third time point of the frame 101e in the time series in the direction from the first region toward the object 1012 in reverse chronological order from the frame 101e corresponding to the time point $t_3$. In the example depicted in FIG. 28, the determining unit 112A determines that the first region exists in the frames 101c to 101e through image processing.

In the above-described manner, the determining unit 112A further determines, through image processing, whether the first region indicating a moving object that is present in the vicinity of the object and on a path of the vehicle exists in each image to which the first annotation is not attached from among the plurality of images acquired by the acquiring unit 111.

Advantageous Effects

As described above, according to the second embodiment, even if the first annotation indicating the first region that does not require high-level recognition is not attached to some of a plurality of images that have been captured by an onboard camera, it is successfully determined autonomously whether the first region exists through image recognition by tracing the first region of the plurality of images (frames) backward. That is, even if the first annotation that is supposed to be attached to some of the plurality of images and that indicates the first region is not attached, it is successfully determined whether the first region exists in the some of the plurality of images through image processing. As a result, since the second annotation indicating the second region that requires high-level recognition can be attached autonomously to the plurality of images that have been captured by the onboard camera, an image processing method and the like capable of reducing the variation in the quality of training data items including the plurality of images can be implemented.

Third Embodiment

In the first embodiment, the description has been given of the case where crowdsourcing workers are caused to attach an annotation indicating a moving object, such as a person, visible in time-series images that have been captured by an onboard camera; however, the configuration is not limited to this one. An image processing apparatus, instead of the workers, may determine a region of a moving object and attach an annotation indicating the region to the time-series images.

This case will be described as a third embodiment below in terms of differences from the first embodiment.

Configuration of Image Processing Apparatus 10B

Figure 29:
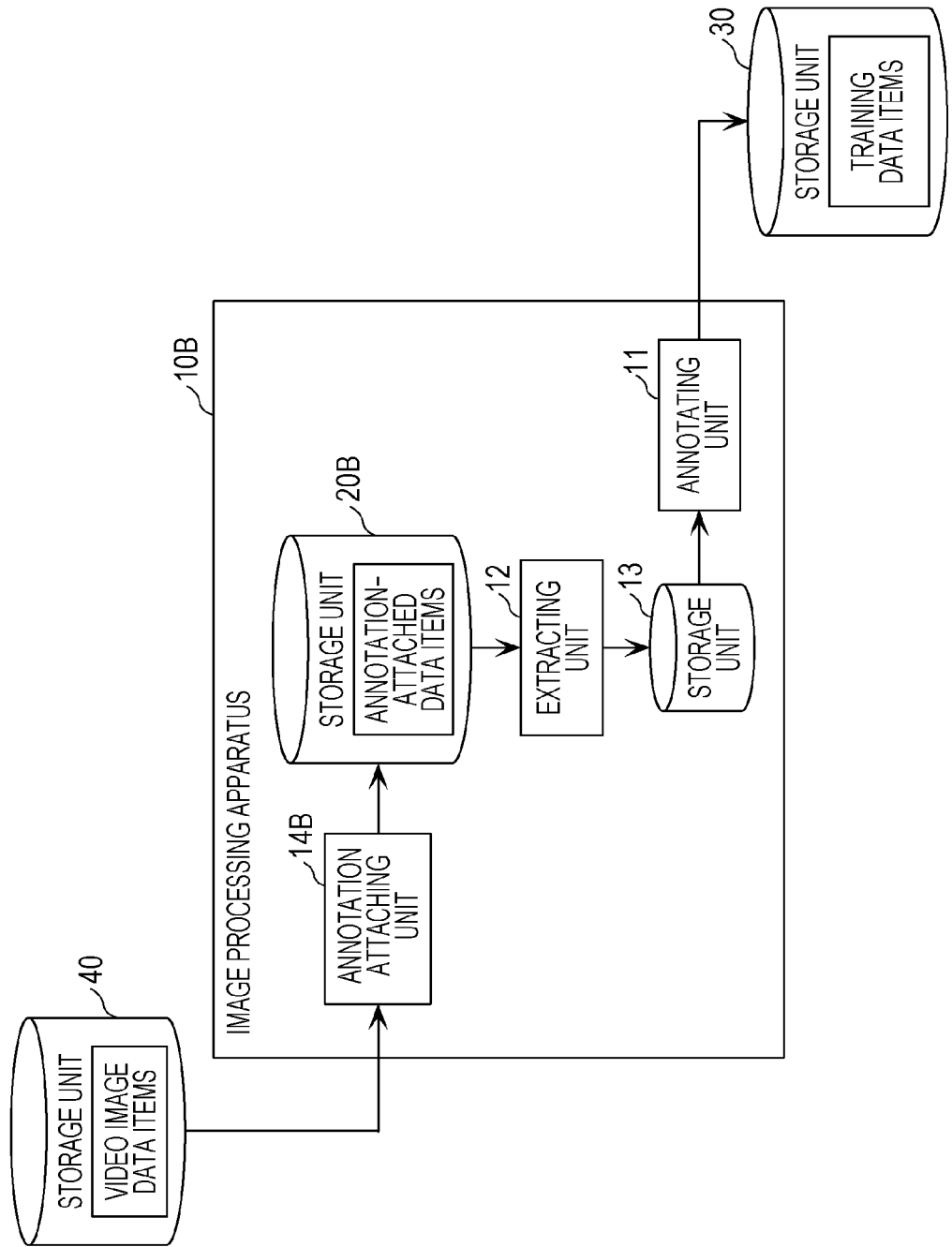
FIG. 29 is a diagram depicting an example of a functional configuration of an image processing apparatus according to a third embodiment.

FIG. 29 is a diagram depicting an example of a functional configuration of an image processing apparatus 10B according to the third embodiment. The same reference signs are assigned to the same or substantially the same components as those depicted in FIG. 1, and a detailed description is omitted.

The image processing apparatus 10B depicted in FIG. 29 differs from the image processing apparatus 10 according to the first embodiment in that the image processing apparatus 10B further includes an annotation attaching unit 14B and a storage unit 20B. Since the rest of the configuration is substantially the same as that of the image processing apparatus 10 according to the first embodiment, a description thereof is omitted.

A storage unit 40 is constituted by an HDD, a memory, or the like. The storage unit 40 stores video image data items (time-series images) that have been captured by an onboard camera.

The annotation attaching unit 14B acquires the video image data times (time-series images) that have been captured by the onboard camera and are stored in the storage unit 40. The annotation attaching unit 14B then determines a region indicating a moving object, such as a person, visible in each of the acquired video image data times (time-series images) by performing image processing and attaches an annotation indicating the region to the video image data items (time-series images). The annotation attaching unit 14B then outputs, as annotation-attached data items to the storage unit 20B, the video image data items (time-series images) to which the annotation has been attached.

The storage unit 20B is constituted by a HDD, a memory, or the like. The storage unit 20B stores data items (annotation-attached data items) to which the annotation has been attached by the annotation attaching unit 14B.

Advantageous Effects

As described above, according to the third embodiment, a region that does not require high-level recognition can be autonomously determined (by the image processing apparatus 10B) and an annotation indicating the region can be autonomously attached (by the image processing apparatus 10B) to image data items (time-series images) that have been captured by an onboard camera instead of causing crowdsourcing workers to do so. Then, a second annotation indicating a second region that requires high-level recognition can be further attached autonomously to the plurality of images that have been captured by the onboard camera.

In this way, according to the third embodiment, the image processing method and the like capable of reducing the variation in the quality of training data items including the plurality of images can be implemented.

While the image processing method and the like according to one or a plurality of aspects of the present disclosure have been described above on the basis of the embodiments, the present disclosure is not limited to these embodiments. Embodiments obtained by applying various modifications conceivable by a person skilled in the art to the embodiments and embodiments obtained by combining elements of different embodiments may be within the scope of the one or plurality of aspects of the present disclosure as long as such embodiments do not depart from the essence of the present disclosure. For example, the following cases are also included in the present disclosure.

(1) Specifically, each of the apparatuses described above is a computer system including a microprocessor, a ROM, a random access memory (RAM), a hard disk unit, a display unit, a keyboard, and a mouse. The RAM or the hard disk unit stores a computer program. The microprocessor operates in accordance with the computer program, whereby the apparatus implements its functions. The computer program is composed of a combination of a plurality of instruction codes representing instructions given to the computer in order to implement predetermined functions.

(2) Some or all of the components of each of the apparatuses described above may be constituted by one system LSI (Large Scale Integration). A system LSI is a super multifunctional LSI produced by integrating a plurality of components on one chip. Specifically, a system LSI is a computer system including a microprocessor, a ROM, a RAM, and so forth. The RAM stores a computer program. The microprocessor operates in accordance with the computer program, whereby the system LSI implements its functions.

(3) Some or all of the components of each of the apparatuses described above may be constituted by an IC card or a discrete module detachably attached to the apparatus. The IC card or the module is a computer system including a microprocessor, a ROM, a RAM, and so forth. The IC card or the module may include the super multifunctional LSI mentioned above. The microprocessor operates in accordance with a computer program, whereby the IC card or the module implements its functions. This IC card or module may be tamper-resistant.

(4) The present disclosure may be construed as the methods described above. In addition, the present disclosure may be construed as a computer program that implements these methods by using a computer or digital signals based on the computer program.

(5) In addition, the present disclosure may be construed as a computer-readable recording medium, for example, a flexible disk, a hard disk, a CD-ROM, an MO, a digital versatile disc (DVD), a DVD-ROM, a DVD-RAM, a Blu-ray (registered trademark) (BD) disc, a semiconductor memory, or the like storing the computer program or the digital signals. In addition, the present disclosure may be construed as the digital signals stored on these recording media.

(6) In addition, the present disclosure may be construed as a configuration in which the computer program or the digital signals are transmitted via an electrical communication line, a wireless or wired communication line, a network typically the Internet, or data broadcasting, for example.

(7) In addition, the present disclosure may be construed as a computer system including a microprocessor and a memory. The memory may store the computer program, and the microprocessor may operate in accordance with the computer program.

(8) In addition, the present disclosure may be implemented such that the program or the digital signals are stored on the recording medium and transferred or the program or the digital signals are transferred via the network or the like to another independent computer system and executed thereby.

The present disclosure can be used as an image processing method, an image processing apparatus, and a recording medium storing a corresponding program. In particular, the present disclosure can be used as an image processing method, an image processing apparatus, and a recording medium storing a corresponding program for creating, without causing the variation in the quality, training data items that are used in machine learning of a hazard region that is likely to be hazardous for a vehicle in motion because a person or the like suddenly comes out.

What is claimed is:

1. An image processing method, performed by a processor, comprising:
    acquiring, with the processor, a plurality of consecutive time-series images that have been captured by an onboard camera mounted on a vehicle and that include at least one image to which a first annotation is attached, the first annotation indicating a first region representing a moving object that is present in the vicinity of an object and on a path of the vehicle in the at least one image;
    determining, with the processor, whether the first region exists in each of the plurality of consecutive time-series images acquired in the acquiring operation, the determining of whether the first region exists in a specific one of the plurality of consecutive time-series images being performed based on whether the first annotation is attached to the specific one of the plurality of consecutive time-series images, the determining operation being performed in reverse chronological order from an image corresponding to the last time point in the time series;

identifying, with the processor, a first image corresponding to a first time point for which the determining operation determines for the first time that the first region is absent from among the plurality of consecutive time-series images, and setting a second region including a part of a region of the object in the identified first image corresponding to the first time point and indicating the obstruction of the moving object by the object before appearing on the path from behind the object, the second region having dimensions based on dimensions of the first region in an image corresponding to a second time point that is the next time point after the first time point in the time series; and attaching, with the processor, a second annotation to the image corresponding to the second time point, the second annotation indicating the second region set in the identifying and setting operations.

2. The image processing method according to claim 1, wherein in the identifying and setting operations, the second region, including a part of the region of the object in the identified first image corresponding to the first time point, is set by shifting the first region in the image corresponding to the second time point in a direction from the first region toward the object by a predetermined distance.

3. The image processing method according to claim 1, wherein in the identifying and setting operations, one or more images are identified in a range from the first time point of the first image to a time point that is a predetermined period before the first time point in the time series, and the second region including a part of the region of the object is set in the one or more identified images.

4. The image processing method according to claim 1, further comprising:

performing, with the processor, a first extracting process of selecting, from among all of consecutive time-series images that have been captured by the onboard camera mounted on the vehicle and that are associated with information representing a braking force or an acceleration of the vehicle, first extracted images that are a plurality of images up to a time point that precedes, by a predetermined period, a time point at which the braking force or acceleration of the vehicle is larger than a threshold; and performing, with the processor, a second extracting process of extracting the plurality of consecutive time-series images including at least one image to which the first annotation is attached from among all of the consecutive time-series images by selecting, from among the first extracted images selected through the first extracting process, a plurality of consecutive time-series images including one or more images to which an annotation indicating a region representing a moving object that is present on the path of the vehicle is attached, wherein in the acquiring operation, the plurality of consecutive time-series images extracted through the second extracting process are acquired.

5. The image processing method according to claim 4, further comprising:

prior to the first extracting process, receiving, with the processor, all of the consecutive time-series images to which are attached, by crowdsourcing, an annotation indicating a region representing a moving object that is present in an image prior to the first extracting process.

6. The image processing method according to claim 5, further comprising:

prior to the second extracting process, receiving, with the processor, each of the first extracted images selected through the first extracting process to which are attached, by crowdsourcing, an annotation indicating a region representing a moving object that is present in the first extracted image.

7. The image processing method according to claim 4, wherein the second region is a hazard region in which there is a risk of collision with the moving object when the vehicle is in motion, and wherein the image processing method further comprises:
adding, with the processor, to the second annotation attached in the attaching operation, an indication of a hazard level based on the braking force or acceleration at a time point at which the braking force or acceleration of the vehicle is larger than the threshold.

8. The image processing method according to claim 1, wherein the moving object is a person, and wherein the second region has dimensions equal to dimensions of the first region.

9. The image processing method according to claim 8, wherein the second region is a hazard region in which there is a risk of collision with the moving object when the vehicle is in motion, and wherein the image processing method further comprises:
adding, with the processor, to the second annotation attached in the attaching operation, an indication of a hazard level based on an attribute of the moving object.

10. The image processing method according to claim 1, wherein the object is a vehicle that is stationary, wherein the moving object is a door of the vehicle, and
wherein the second region has dimensions equal to dimensions of the first region.

11. The image processing method according to claim 1, wherein the moving object is a child's plaything, and wherein the second region has dimensions equal to dimensions of a region obtained by enlarging the first region in a height direction of the first image corresponding to the first time point.

12. The image processing method according to claim 1, wherein the second region is a hazard region in which there is a risk of collision with the moving object when the vehicle is in motion, and wherein the image processing method further comprises:
adding, with the processor, to the second annotation attached in the attaching operation, an indication of a hazard level that increases as the dimensions of the second region increase.

13. The image processing method according to claim 1, wherein the determining operation includes performing, with the processor, a first determining process of determining, in reverse chronological order from the image corresponding to the last time point in the time series, a first image corresponding to a third time point to which the first annotation is not attached from among the plurality of consecutive time-series images acquired in the acquiring operation, and performing, with the processor, a second determining process of determining, through image processing, whether the first region exists at a position in each image obtained by shifting the first region in an image corresponding to the next time point after the third time point of the first image that has been determined in the first determining process in a direction from the first region toward the object in the image corresponding to the next time point after the third time point in reverse chronological order from the first image corresponding to the third time point.

14. An image processing apparatus comprising a processor performing the functions of:
an acquirer that acquires a plurality of consecutive time-series images that have been captured by an onboard camera mounted on a vehicle and that include at least one image to which a first annotation is attached, the first annotation indicating a first region representing a moving object that is present in the vicinity of an object and on a path of the vehicle in the at least one image;
a determiner that determines whether the first region exists in each of the plurality of consecutive time-series images acquired by the acquirer, the determining of whether the first region exists in a specific one of the plurality of consecutive time-series images by the determiner being performed based on whether the first annotation is attached to the specific one of the plurality of consecutive time-series images, the determiner performing the determining operation in reverse chronological order from an image corresponding to the last time point in the time series;
a setter that identifies a first image corresponding to a first time point for which the determiner determines for the first time that the first region is absent from among the plurality of consecutive time-series images, and sets a second region including a part of a region of the object in the identified first image corresponding to the first time point and indicating the obstruction of the moving object by the object before appearing on the path from behind the object, the second region having dimensions based on dimensions of the first region in an image corresponding to a second time point that is the next time point after the first time point in the time series; and
an attacher that attaches a second annotation to the image corresponding to the second time point, the second annotation indicating the second region set by the setter.

15. A non-transitory computer-readable recording medium storing a program thereon, the program causing a processor of a computer to execute a method comprising:
acquiring, with the processor, a plurality of consecutive time-series images that have been captured by an onboard camera mounted on a vehicle and that include at least one image to which a first annotation is attached, the first annotation indicating a first region representing a moving object that is present in the vicinity of an object and on a path of the vehicle in the at least one image;
determining, with the processor, whether the first region exists in each of the plurality of consecutive time-series images acquired in the acquiring operation, the determining of whether the first region exists in a specific one of the plurality of consecutive time-series images being performed based on whether the first annotation is attached to the specific one of the plurality of consecutive time-series images, the determining operation being performed in reverse chronological order from an image corresponding to the last time point in the time series;
identifying, with the processor, a first image corresponding to a first time point for which the determining operation determines for the first time that the first region is absent from among the plurality of consecutive time-series images, and setting a second region including a part of a region of the object in the identified first image corresponding to the first time point and indicating the obstruction of the moving object by the object before appearing on the path from behind the object, the second region having dimensions based on dimensions of the first region in an image corresponding to a second time point that is the next time point after the first time point in the time series; and
attaching, with the processor, a second annotation to the image corresponding to the second time point, the second annotation indicating the second region set in the identifying and setting.

* * * * *